(12) United States Patent
Asamizu et al.

(10) Patent No.: US 8,950,050 B2
(45) Date of Patent: Feb. 10, 2015

(54) VEHICLE BODY DOOR OPENING METHOD AND DEVICE, DOOR REMOVING DEVICE AND METHOD, DOOR HOLDING DEVICE AND METHOD, AND SOCKET

(75) Inventors: Kenichi Asamizu, Tochigi (JP); Masashi Iwata, Tochigi (JP); Tomohisa Katayama, Tochigi (JP); Gentoku Fujii, Tochigi (JP); Sumio Noguchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 13/337,585

(22) Filed: Dec. 27, 2011

(65) Prior Publication Data

US 2012/0163948 A1 Jun. 28, 2012

(30) Foreign Application Priority Data

Dec. 28, 2010 (JP) ................. 2010-291807
Dec. 28, 2010 (JP) ................. 2010-291808
Dec. 28, 2010 (JP) ................. 2010-291809
Dec. 28, 2010 (JP) ................. 2010-291810

(51) Int. Cl.
*B25J 9/02* (2006.01)
*B25J 9/00* (2006.01)
*B62D 65/06* (2006.01)

(52) U.S. Cl.
CPC .............. *B25J 9/0087* (2013.01); *B62D 65/06* (2013.01)
USPC .......................... 29/426.1; 29/879.2; 29/281.1

(58) Field of Classification Search
CPC ......... B23P 19/04; B25B 11/02; B25B 11/00; B64F 5/0009; F01D 25/285; B25J 9/02; B25J 9/16

USPC ......... 29/56.6, 281.1, 281.4, 281.5, 709, 719, 29/897.2, 897

See application file for complete search history.

(56) References Cited

U.S. PATENT DOCUMENTS

| 5,079,832 | A | 1/1992 | Ozawa et al. | |
|---|---|---|---|---|
| 5,210,931 | A | 5/1993 | Ozawa et al. | |
| 5,286,160 | A * | 2/1994 | Akeel et al. | 414/744.3 |
| 6,339,874 | B2 * | 1/2002 | Segawa et al. | 29/824 |
| 2008/0168639 | A1 * | 7/2008 | Otake et al. | 29/56.6 |
| 2009/0045654 | A1 * | 2/2009 | Yoshida | 296/207 |
| 2009/0204260 | A1 * | 8/2009 | Bryne et al. | 700/259 |

(Continued)

FOREIGN PATENT DOCUMENTS

| JP | H02-279478 | 11/1990 |
|---|---|---|
| JP | 09-103925 | 4/1997 |
| JP | 2000-190244 | 7/2000 |

(Continued)

*Primary Examiner* — Alexander P Taousakis
*Assistant Examiner* — Lee A Holly
(74) *Attorney, Agent, or Firm* — Rankin, Hill & Clark LLP

(57) ABSTRACT

A door opening method and device are provided that can reduce the size of the installation location of a robot, as well as achieve a reduction in cycle time. In a dual arm robot, two arms are rotated by each of an shaft S1 and an shaft S2. As a result, a door opening action (Step ST2) is realized by rotation using the shaft S1. Then, a movement to enter an interior side of a door (91) in order to perform a bolt loosening action is realized by rotation using the shaft S1 and shaft S2. The movement in this case is movement such as to face the direction of the door (91). As a result, when moving to a door holding position (Step S26), the dual arm robot is at an attitude facilitating performing a bolt loosening action.

4 Claims, 31 Drawing Sheets

(56) References Cited

U.S. PATENT DOCUMENTS

| | | | |
|---|---|---|---|
| 2011/0020561 A1* | 1/2011 | Tani | 427/458 |
| 2011/0022228 A1* | 1/2011 | Mikurube et al. | 700/248 |

FOREIGN PATENT DOCUMENTS

| | | |
|---|---|---|
| JP | 2006-102847 | 4/2006 |
| JP | 2006159351 | 6/2006 |
| JP | 2007-111776 | 5/2007 |
| JP | 2009-006429 | 1/2009 |
| JP | 2009-214230 | 9/2009 |
| JP | 2009-214701 | 9/2009 |
| JP | 2010-162666 | 7/2010 |
| WO | 2007/046250 | 4/2007 |
| WO | WO 2009113360 A1 * | 9/2009 |

* cited by examiner

VEHICLE BODY DOOR OPENING METHOD AND DEVICE, DOOR REMOVING DEVICE AND METHOD, DOOR HOLDING DEVICE AND METHOD, AND SOCKET

This application is based on and claims the benefit of priority from Japanese Patent Application Nos. 2010-291810, 2010-291809, 2010-291808, and 2010-291807, respectively filed on 28 Dec. 2010, the contents of which are incorporated herein by reference.

BACKGROUND OF THE INVENTION

1. Field of the Invention

A first aspect of the present invention relates to a method of opening a door of a vehicle body and a device that are suited to application in a door removing system that can remove a door of a vehicle. More specifically, the invention relates to a method of opening a door and a device that can reduce the installation space of the robot and achieve a reduction in the cycle time.

A second aspect of the present invention relates to a door removing device and method that can remove the door of a vehicle. More specifically, the invention relates to a door removing device and method that can improve the layout properties of a facility by reducing the number of robots.

A third aspect of the present invention relates to a door holding device and method that can be applied to a door removing system that can remove the door of a vehicle. More specifically, the invention relates to a door holding device and method that can hold a door so as not to be scratched, with only one dual arm robot using a tool that has been reduced in size.

A fourth aspect of the present invention relates to a socket that is suited for use in the door removing system. More specifically, the invention relates to a socket that can be used in the door removing system capable of removing the door of a vehicle.

2. Related Art

Conventionally, in the manufacturing process of vehicles, after painting of a vehicle to which the doors have been temporarily fixed to the body with bolts is performed, the doors are removed from the body by the bolts being removed, and the doors and the body are assembled in separates lines.

During the manufacturing process of vehicles in this way, there is a process for removing the doors from the vehicle (hereinafter referred to as "door removing process").

A door removing system used in such a door removing process is described in Patent Document 1, for example.

The door removing system described in Patent Document 1 includes two first robots position on either side of the body and equipped with nut runners, and two second robots positioned on either side of the body and holding the doors, and operates as follows.

In other words, the first robots release the connection between the doors and body by loosening the bolts using the nut runners, in a state in which the doors are open. Thereafter, the second robots hold and convey the doors.

Herein, the second robots are single arm robots, and have a door holding hand dedicated to holding one door. The structure of this door holding hand differs for every model depending on the shape and structure of the door.

However, with the door removing system described in Patent Document 1, one door is conveyed by supporting with one single arm robot; therefore, there has been a problem in that the robot is large scale, and the occupied space of the robot is large, and thus the general versatility of the robot declines.

In addition, in a line producing several models, since the shape and structure of doors differ for every model, there has been a problem in that a plurality of types of jigs becomes necessary, thereby increasing the cost.

Furthermore, there is a problem in that the holding jigs are exchanged and adjusted every time the model to be produced on the manufacturing line changes, and thus the cycle time lengthens.

Therefore, in order to solve these problems, the present inventors have already disclosed a door removing system using a dual arm robot as the robot for holding and conveying one door in Patent Document 2.

However, with such a door removing process, the operations are performed in a crowded space, and thus it is difficult to secure the space to be occupied by the robot. As a result, there has been a problem in that the operation to remove the bolts in order to release the connection between the doors and body must be performed in an extremely narrow space.

Therefore, in order to solve such a problem, for example, a wrench equipped with a nut outgoing path that permits the passage of a nut is disclosed in Patent Document 3. Similarly, a wrench configured to be able to push out nuts by way of a sliding piece configured to be movable in an axial direction of the wrench is disclosed in Cited Publication 4 as well.

Such technology disclosed in Patent Documents 3 and 4 can be used in the door removing system disclosed in Patent Document 2 or the like.

Patent Document 1: Japanese Unexamined Patent Application Publication No. H9-103925
Patent Document 2: Japanese Unexamined Patent Application Publication No. 2009-214701
Patent Document 3: Japanese Unexamined Patent Application Publication No. 2000-190244
Patent Document 4: Japanese Unexamined Patent Application Publication No. 2009-6429

SUMMARY OF THE INVENTION

However, the current situation is that shortening of the cycle time is demanded, along with reducing the size of the installation location of the robot even more than the door removing system described in Patent Document 2.

In addition, the current situation is that an improvement in the facility layout properties and a reduction in the external damage to doors during removal are demanded even more than the door removing system described in Patent Document 2.

Moreover, the current situation is that the holding of a door without scratching is demanded with one dual arm robot using a tool reduced in size, which has not been able to be realized with the door removing system described in Patent Document 2.

Furthermore, with the wrench disclosed in Patent Document 3, since the nut outgoing path projects laterally to the wrench, the projected nut outgoing path has been a main factor obstructing the work space of the robot to which the wrench is installed.

In addition, the nut outgoing path provided to the wrench disclosed in Patent Document 3 curves towards the side of the wrench; therefore, even if a short nut can be ejected to outside through the nut outgoing path, a long bolt would not be able to pass the curved part, and thus a long bolt has not been able to be ejected thereby.

Similarly, the nut outgoing path provided to the wrench disclosed in Patent Document 3 cannot allow a flanged bolt to pass the inside of the outgoing path due to the flange of the flanged bolt getting caught in the curved nut outgoing path, and thus has not been able to eject a flanged bolt.

In addition, with the wrench disclosed in Patent Document 4, in order for the sliding piece for pushing out nuts to be moveable in the axial direction of the wrench, it is formed to be long in the axial direction of the wrench. As a result, it is necessary to ensure a certain length in the axial direction of the wrench, and the wrench projecting in the axial direction has been a main factor obstructing the work space of the robot.

Furthermore, although the wrench disclosed in Patent Document 4 is formed to allow the nuts to move in the axial direction of the wrench, since the flange of a flanged bolt spread out in the radial direction of the wrench, there has been concern over the flange catching on the inside of the wrench.

As a result, the current situation is that a socket suited to use in a door removing system that can remove the doors of a vehicle is demanded that can be installed in a compact space.

A first aspect of the invention has been made taking the current situation into account, and has an object of providing a door opening method and device suited to application in a door removing system that can reduce the size of the installation location of a robot, as well as achieve a reduction in cycle time.

A second aspect of the invention has been made taking the current situation into account, and has an object of providing a door removing system and method that can improve the facility layout properties by decreasing the number of robots.

A third aspect of the invention has been made taking the current situation into account, and has an object of providing a door holding device and method that can hold a door so as not to scratch it, with only one dual arm robot using a tool that is reduced in size.

A fourth aspect of the invention has been made taking the current situation into account, and has an object of providing a socket suited to use in a door removing system that can remove the door of a vehicle, the socked being installable in a compact space.

According to a first aspect of the invention, a method of opening a door of a vehicle body executed by a door opening device (e.g., the dual arm robot 11 of the embodiment) including at least one arm (e.g., the first arm 22R1 or second arm 22R2 of the embodiment) having a tool (e.g., the first holding jig 23R1 or second holding jig 23R2 in the embodiment) for opening a door (e.g., the door 91 of a vehicle in the embodiment) from the vehicle body, and a pedestal (e.g., the robot main body 21 in the embodiment) to which the at least one arm is installed, in which the pedestal includes a first rotational shaft (e.g., the S1 shaft in the embodiment) in a direction substantially vertical to a ground, and a second rotational shaft (e.g., the S2 shaft) that is positioned to be offset in a ground direction relative to the first rotational shaft, the method includes: holding the door from outside by at least one of the at least one arm, opening the door by causing the first rotational shaft to rotate, and further rotating the first rotational shaft and moving the pedestal to an interior side of the door thus opened, as well as rotating the second rotational shaft so that the at least one arm faces a front relative to a work location of the door.

According to the present invention, movement of the at least one arm (door opening device as a robot) becomes possible by simply providing the two of the first rotational shaft and second rotational shaft. Therefore, the installation location of the robot is reduced in size.

In addition, when opening of the door has finished, the at least one arm (door opening device as a robot) comes to be at an attitude at which the operations on the door are facilitated. Therefore, the cycle time is shortened.

The door opening device for vehicle bodies according to the first aspect of the invention is a device corresponding to the aforementioned method of opening a door of a vehicle body. Therefore, it is possible to exert various effects similarly to the aforementioned method of opening a door of a vehicle body of the present invention.

According to a second aspect of the present invention, a door removing device (e.g., the dual arm robot 11 in the embodiment) that removes a door (e.g., the door 91 of a vehicle in the embodiment) fixed with a bolt to a body of a vehicle from the body, includes:

a first arm (e.g., the first arm 22R1 in the embodiment) having a first holding jig (e.g., the first holding jig 23R1 in the embodiment) that holds the door;

a second arm (e.g., the second arm 22R2 in the embodiment) having a bolt unfastening mechanism that unfastens the bolt fixing the door, and a second holding jig that holds the door (e.g., the second holding jib 23R2 including both the bolt loosening tool 74 that is one example of a bolt unfastening mechanism, and the door holding pad 72 in the embodiment); and a load bearing member (e.g., the door H-receiving member 24 in the embodiment) that receives a load of the door in the direction of gravitational force.

According to the present invention, in the door removing process, it is sufficient to establish only one door removing device (dual arm robot having a first arm and a second arm) per at least one door. The number of robots established in the door removing process can thereby be reduced, whereby the layout properties of the facility improve.

In this case, it may be configured to further include a stand (e.g., the robot main body 21 in the embodiment) of the first arm and the second arm, in which the first arm inserts into an opening portion of an inner panel of the door to hold a portion of the door using the first holding jig, the second arm inserts into an opening portion of the inner panel of the door to hold another portion of the door using the second holding jig, and the load bearing member is provided to the stand.

According to the present invention, by inserting the holding tool in an opening portion, it is possible to disperse the weight of the door acting on the robot; therefore, it is possible to implement the dual arm robot 11 with a smaller configuration.

In addition, since an outer panel surface of the door is not held, external damage to the door can be mitigated.

According to the second aspect of the invention, a method of removing a door executed by a device corresponding to the aforementioned door removing device of the present invention includes the steps of:

setting the load bearing member at a lower part of the door when performing an action of loosening the bolt;

receiving moments in the direction of gravitational force of the door and a lateral direction of the door with one arm among the first arm and the second arm, and unfastening the bolt fixing the door with the other arm; and receiving the moments in the direction of gravitational force of the door and the lateral direction of the door with the one arm among the first arm and the second arm, and holding the door with the other arm, when performing an action of holding and transporting the door.

According to the present invention, in the door removing process, it is sufficient to establish only one door removing device (dual arm robot having the first arm and the second arm) per at least one door. The number of robots established in the door removing process can thereby be reduced, whereby the layout properties of the facility improve.

According to a third aspect of the present invention, a door holding device (e.g., the dual arm robot 11 in the embodiment) that holds a door (e.g., the door 91 of a vehicle in the embodiment) of a vehicle, includes:

a load bearing member (the door H-receiving member 24 in the embodiment) that receives a force in the direction of gravitational force of the door; and a holding tool (e.g., the first holding jig 23R1 in the embodiment) that holds the door, wherein the holding tool has two pads (e.g., the door holding pads 53 and 54 in the embodiment) that can vary a relative distance between two holding points (e.g., the points PA and PB in the embodiment), and that respectively abut the two holding points on an opening portion (e.g., the opening portion 120 of the door 91 or the like in the embodiment) of an inner panel of the door, and wherein one pad (e.g., the door holding pad 53 in the embodiment) among the two pads abuts one of the holding points (e.g., the point PA in the embodiment) on the opening portion in a direction receiving a force in a load direction of the door, and the other pad (e.g., the door holding pad 54 in the embodiment) abuts another one of the holding points (e.g., the point PB in the embodiment) on the opening portion in a direction receiving moments generated by the load bearing member and the one pad.

According to the present invention, since the door can be held by the load bearing member and one holding tool, the required arms of the robot upon removing the door from the body is simply one. Therefore, establishing one of the dual arm robots per at least one door is sufficient in the door removing process.

In addition, since only causing the pad to abut the opening portion of the door is sufficient, a motive force is not required for holding, and it is possible to achieve a size reduction in the holding tool.

Furthermore, due to using the opening portion of the inner panel of the door in the holding thereof, the door will not be scratched.

In summary, it is possible to hold a door so as not to scratch it, with only one dual arm robot using a holding tool that is reduced in size.

A method of holding a door according to the third aspect is a method corresponding to the aforementioned door holding device of the present invention. Therefore, it is possible to exert various effects similarly to the aforementioned door holding device of the present invention.

According to a fourth aspect of the present invention, a socket (e.g., the bolt loosening tool 74 in the embodiment) for use in removal of a fastener (e.g., the bolt 250 in the embodiment), includes:

an engaging part (e.g., the engaging part 212 in the embodiment) that engages with the fastener;

a sliding part (e.g., the sliding socket 203 in the embodiment) having the engaging part on an inner side thereof;

a rotatable cylinder (e.g., the cylinder 201 in the embodiment) in which the sliding part slides and rotates therewith;

a magnet (e.g., the magnet 206 in the embodiment) provided at a retracting end side of the sliding part and contacting and an outer side of the engaging part; and a fluid mechanism (e.g., the fluid mechanism 204 in the embodiment) that discharges, towards the outer side of the engaging part, a fluid (e.g., air) to push the sliding part to an advancing end side.

According to the present invention, when removing the fastener, not only can the fastener engaged with the engaging part be removed by rotating and loosening by way of rotating the cylinder, but the fastener loosened and unfastened can be attracted by the magnet and retained inside of a sliding portion.

In addition, upon ejecting the fastener, by causing the cylinder to rotate in the reverse direction, the magnetic force between the fastener and the magnet weakens and the retaining by the magnet is released, and by the energy of fluid discharged from the fluid mechanism, it is possible to eject the fastener to outside of the sliding part.

Since it is thereby possible to perform loosening and ejecting of the fastener based on the magnet and the fluid mechanism, the removal of a door can be performed in a compact space.

According to the first aspect of the present invention, movement of the at least one arm (door opening device as a robot) becomes possible by simply providing the two of the first rotational shaft and second rotational shaft. Therefore, the installation location of the robot is reduced in size.

In addition, when opening of the door has finished, the At least one arm (door opening device as a robot) comes to be at an attitude at which the operations on the door are facilitated. Therefore, the cycle time is shortened.

According to the second aspect of the present invention, in the door removing process, it is sufficient to establish only one door removing device (dual arm robot having a first arm and a second arm) per at least one door. The number of robots established in the door removing process can thereby be reduced, whereby the layout properties of the facility improve.

According to the third aspect of the present invention, it is possible to hold a door so as not to scratch it, with only one dual arm robot using a holding tool that is reduced in size.

According to the fourth aspect of the present invention, since it is thereby possible to perform loosening and ejecting of the fastener based on the magnet and the fluid mechanism, the removal of a door can be performed in a compact space.

The removal of a door can thereby be performed in a compact space.

DETAILED DESCRIPTION OF THE INVENTION

Hereinafter, an embodiment of the present invention will be explained based on the drawings.

Figure 1:
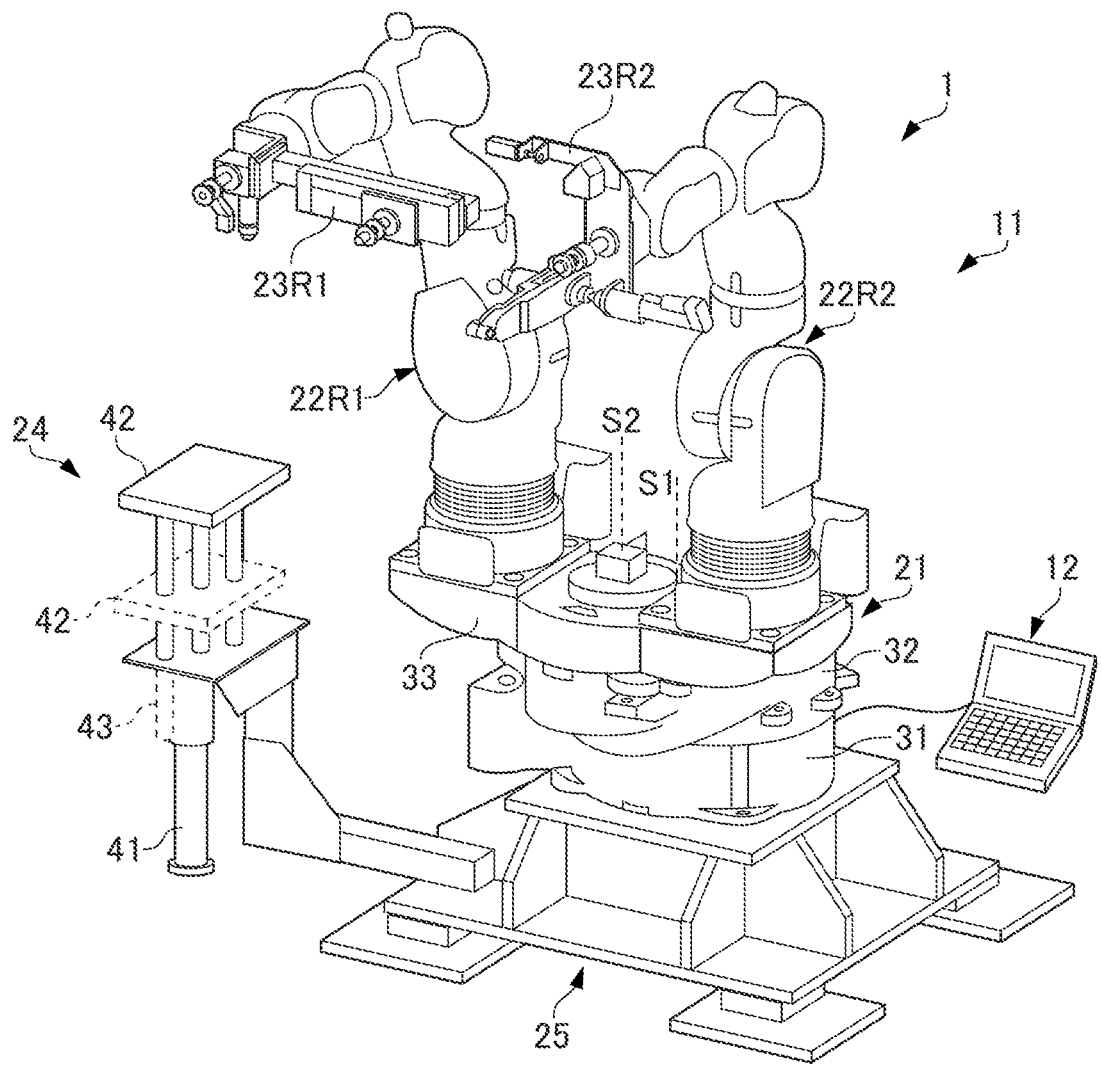
FIG. 1 is a perspective view showing a schematic exterior configuration of a door removing system according to an embodiment of the present invention.

FIG. 1 is a perspective view showing a schematic exterior configuration of a door removing system according to one embodiment of the present invention.

A door removing system 1 includes a dual arm robot 11 and a control unit 12.

The dual arm robot 11 can remove a door temporarily fixed by bolts to the body of a vehicle not illustrated in FIG. 1 from the body, under the control of the control unit 12.

The dual arm robot 11 includes a robot main body 21, a first arm 22R1, a second arm 22R2, a first holding jig 23R1, a second holding jig 23R2, a door H-receiving member 24, and a stand 25.

The robot main body 21 includes a base portion 31, a first swivel portion 32, and a second swivel portion 33.

The base portion 31 is installed by fixing onto the stand 25.

The first swivel portion 32 is installed to an upper part of the base portion 31 to be swivelable about a rotational shaft S1, which is in a substantially vertical direction.

The second swivel portion 33 is installed to an upper part of the first swivel portion 32 to be swivelable about a rotational shaft S2, which is in a substantially vertical direction.

Herein, the rotational shaft S1 and the rotational shaft S2 are established to be separated by a predetermined distance in the horizontal direction (direction substantially parallel to the floor) and independent from each other. In other words, each of the first swivel portion 32 and second swivel portion 33 swivel independently from each other according to the control of the control unit 12.

It should be noted that further details of the first swivel portion 32 and second swivel portion 33 will be described later while referencing FIGS. 7 to 18.

Each of the first arm 22R1 and the second arm 22R2 are installed at upper parts at both ends of the second swivel portion 33 of the robot main body 21 to interpose the rotational shaft S2.

Each of the first arm 22R1 and second arm 22R2 is configured as a multi-joint manipulator. In other words, each of the first arm 22R1 and the second arm 22R2 includes a plurality of joints, a plurality of coupling members, servo-motors that cause each joint to rotate, and a detection unit that detects the various states such as the position of the servo-motor, speed, and current.

The overall actions of each of the first arm 22R1 and second arm 22R2 are realized independently from each other according to a combination of the rotational actions of each joint by way of the servo-motors, and movement actions of each coupling member working together with these rotational actions.

The first holding jig 23R1 is installed as an end effector to a leading end of the first arm 22R1, and moves up to the door or the like of a vehicle accompanying the movement action of the first arm 22R1. When this is done, the first holding jig 23R1 carries out various actions such as holding the door of the vehicle, according to the control of the control unit 12.

It should be noted that further details of the first holding jig 23R1 will be described later by referencing FIG. 2.

The second holding jig 23R2 is installed as an end effector to a leading end of the second arm 22R2, and moves up to the door or the like of the vehicle accompanying the movement action of the second arm 22R2. When this is done, the second holding jig 23R2 carries out various actions such as removing the bolts temporarily fixing the door and the body of the vehicle, and holding the door of the vehicle, according to the control of the control unit 12.

It should be noted that further details of the second holding jig 23R2 will be described later by referencing FIGS. 3A and 3B.

The door H-receiving member 24 is installed to the stand 25 to be able to rise and lower in a substantially vertical direction, and holds the door of the vehicle so as to catch the door from below in a substantially vertically upward direction.

More specifically, the door H-receiving member 24 includes a lift cylinder 41, a urethane pad 42, and a measurement cylinder 43.

The lift cylinder 41 is a cylinder that raises and lowers the urethane pad 42 to any position. The urethane pad 42 latches at a lower part of the door of the vehicle, and holds the door so as to catch the door in a substantially vertically upward direction. The measurement cylinder 43 is a cylinder that rises and lowers together with the urethane pad 42, and can measure the position in the vertical direction of the urethane pad 42 according to the stroke position thereof.

It should be noted that further details of the door H-receiving member 24 will be described later while referencing FIGS. 5, 24 and 25, as appropriate.

The stand 25 is arranged to be fixed to the floor, and mounts the robot main body 21 to which the first arm 22R1 and second arm 22R2 are equipped (more precisely, the base portion 31), and the door H-receiving member 24, as described above.

The control unit 12 controls the actions of the dual arm robot 11.

More specifically, the control unit 12 controls the mutually independent swiveling of each of the first swivel portion 32 and second swivel portion 33 of the robot main body 21.

In addition, the control unit 12 performs mutually independent positioning control of the first arm 22R1 and the second arm 22R2.

Furthermore, the control unit 12 controls the actions of the first holding jig 23R1 and the second holding jig 23R2.

Moreover, the control unit 12 controls the rising and lowering actions of the door H-receiving member 24.

Figure 2:
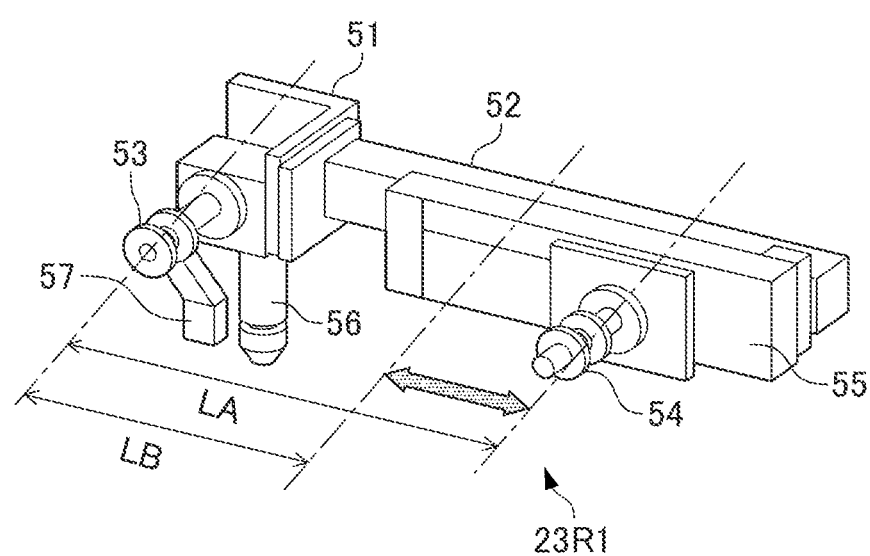
FIG. 2 is a perspective view showing a schematic exterior configuration of a first holding jig of a dual arm robot of the door removing system.

FIG. 2 is a perspective view showing a schematic exterior configuration of the first holding jig 23R of the dual arm robot 11 in the door removing system 1 of such a configuration.

The first holding jig 23R1 includes a support portion 51, a frame 52, door holding pads 53 and 54, a model-switching shift member 55, a door opening pin 56, and a sensor 57.

The support portion 51 supports the first holding jig 23R1 to the first arm 22R1 by being installed to the leading end of the first arm 22R1.

The frame 52 is installed to the support portion 51, and a longitudinal direction thereof extends in a substantially parallel direction to the face of the leading end of the first arm 22R1.

The door holding pad 53 is installed to the support portion 51 so as to project relative to the frame 52, and holds one point of the door of a vehicle that is not illustrated in FIG. 2.

The door holding pad 54 is installed to the model-switching shift member 55 to project relative to the frame 52 and move away from the door holding pad 53 substantially parallel to the longitudinal direction of the frame 52, and holds one point of the door of a vehicle that is not illustrated in FIG. 2.

In other words, two points of the door of a vehicle that is not illustrated in FIG. 2 that are separated from each other in a predetermined direction are held by the door holding pads 53 and 54, respectively, in a state in which the predetermined direction and the longitudinal direction of the frame 52 are substantially parallel (state in which the first arm 22R1 is moved in this way).

It should be noted that further details of the method of holding the door will be described later while referencing FIGS. 5 and 19 to 24.

The model-switching shift member 55 is installed to the frame 52, and causes the position of the door holding pad 54 to move along the longitudinal direction of the frame 52, by sliding in the longitudinal direction of the frame 52 depending on the model of vehicle that is the target for removing the door. In other words, the model-switching shift member 55 has a function of causing the separation distance between the door holding pads 53 and 54 in the longitudinal direction of the frame 52 to vary within a range from a distance LA to a distance LB.

The door opening pin 56 is installed to the support portion 51 so as to project relative to the frame 52 in a substantially vertical direction to the door holding pad 53, and is used when opening the door of a vehicle not illustrated in FIG. 2.

The sensor 57 is installed to the support portion 51 so as to project relative to the frame 52 in a substantially vertical direction to the door holding pad 53, and detects the insertion position of the door opening pin 56 on the door of a vehicle not illustrated in FIG. 2.

The action to open the door of the vehicle using the door opening pin 56 and the sensor 57 will be described later while referencing FIG. 4.

In the foregoing, the schematic exterior configuration of the first holding jig 23R1 of the dual arm robot 11 in the door removing system 1 of the configuration shown in FIG. 1 has been explained while referencing FIG. 2.

Next, the schematic exterior configuration of the second holding jig 23R2 of the dual arm robot 11 will be explained while referencing FIGS. 3A and 3B.

Figure 3A:
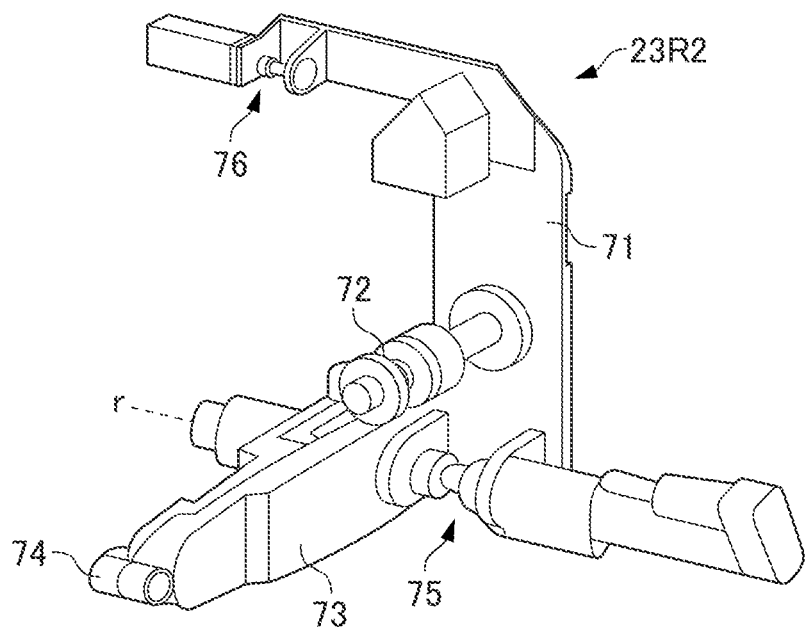
FIGS. 3A and 3B are a perspective view showing a schematic exterior configuration of a second holding jig of the dual arm robot of the door removing system.
Figure 3B:
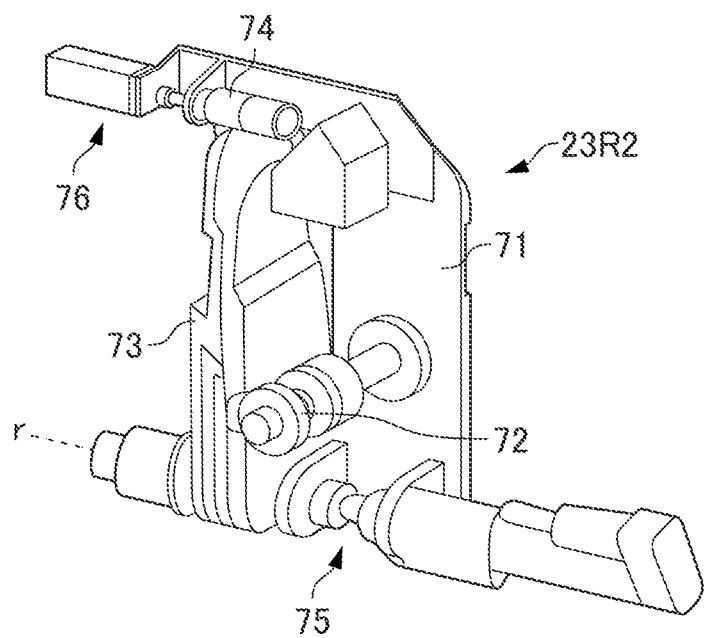

FIGS. 3A and 3B are a perspective view showing a schematic exterior configuration of the second holding jig 23R2 of the dual arm robot 11 in the door removing system 1.

The second holding jig 23R2 includes a support portion 71, a door holding pad 72, a frame 73, a bolt loosening tool 74, a leading-end tool switching mechanism 75, and a bolt ejecting mechanism 76.

The support portion 71 supports the second holding jig 23R2 to the second arm 22R2 by being installed to the leading end of the second arm 22R2.

The door holding pad 72 is installed to the support portion 71 so as to project, and holds one point of the door of a vehicle that is not illustrated in FIGS. 3A and 3B.

However, in the state shown in FIG. 3A, since the bolt loosening tool 74 described later projects relative to the support portion 71 more than the door holding pad 72, it becomes difficult to hold one point of the door by way of the door holding pad 72.

Therefore, the door holding pad 72 holds one point of the door in the state shown in FIG. 3B, i.e. a state in which the bolt loosening tool 74 described later is folded up to the side of the support portion 71, and only the door holding pad 72 is projecting.

In this case, the door holding pad 72 can hold a third point of the door (apexes of a triangle of a predetermined shape), along with the door holding pads 53 and 54 of the first holding jib 23 shown in FIG. 2, as required. It should be noted that such a way of holding a door is called "3-point holding". The details of 3-point holding will be described later while referencing FIGS. 19 to 24.

One end in the longitudinal direction of the frame 73 is connected to the leading-end tool switching mechanism 75 described later, and the bolt loosening tool 74 is installed to the other end thereof in the longitudinal direction.

The frame 73 is configured to be rotatable about an axis r of the leading-end tool switching mechanism 75 described later, and can assume the state shown in FIG. 3A or FIG. 3B as the arrangement state thereof.

In the case of the arrangement state of the frame 73 being the state shown in FIG. 3A, the door holding pad 72 functions as described in the forgoing, and the holding of one point of the door is carried out. It should be noted that the state shown in FIG. 3A is hereinafter called a "loosening position state".

In contrast, in the case of the arrangement state of the frame 73 being the state shown in FIG. 3B, the bolt loosening tool 74 functions. It should be noted that the state shown in FIG. 3B is hereinafter called a "holding position state".

The bolt loosening tool 74 sets a bolt whereby the door of a vehicle not illustrated in FIGS. 3A and 3B is temporarily fixed to the body as a work target, and carries out an action to loosen the bolt under the control of the control unit 12 shown in FIG. 1.

It should be noted that the details of the action for loosening a bolt by way of the bolt loosening tool 74 will be described later while referencing FIGS. 5 and 26 to 31.

The leading-end tool switching mechanism 75 causes the frame 73 to rotate until entering the holding position state and then retains this state under the control of the control unit 12 shown in FIG. 1, in a case of holding the door of a vehicle that is not illustrated in FIGS. 3A and 3B, and causes the frame 73 to rotate until entering the loosening position state and retains this state in a case of loosening a bolt whereby the door of the vehicle is temporarily fixed to the body. In other words, the leading-end tool switching mechanism 75 has a function of switching from one among the door holding pad 72 and the bolt loosening tool 74 to the other one as the leading end tool functioning at the second holding jig 23R2, as is indicated by the name thereof.

The bolt ejecting mechanism 76 is installed to the support portion 71 so as to extend in substantially the same direction of the axis r of the leading-end tool switching mechanism 75, and when transitioning from the holding position state shown in FIG. 3B to the loosening position state shown in FIG. 3A, ejects the bolt accommodated in the bolt loosening tool 74 to outside.

It should be noted that the point at which a bolt is accommodated in the bolt loosening tool 74 will be described later while referencing FIGS. 26 to 31.

In the foregoing, the configuration of the door removing system 1 has been explained while referencing FIGS. 1 to 3.

Next, actions of the door removing system 1 will be explained while referencing the drawings of FIG. 4 and later.

Since the door removing system 1 is established in the door removing process, the actions thereof are generally classified into the three categories of an action to open a door of a vehicle from a body (hereinafter referred to as "door opening action"), an action to loosen and remove a bolt temporarily fixing the door and the body (hereinafter referred to as "bolt loosening action"), and an action to hold and transport the door (hereinafter referred to as "door holding and transporting action").

Figure 4:
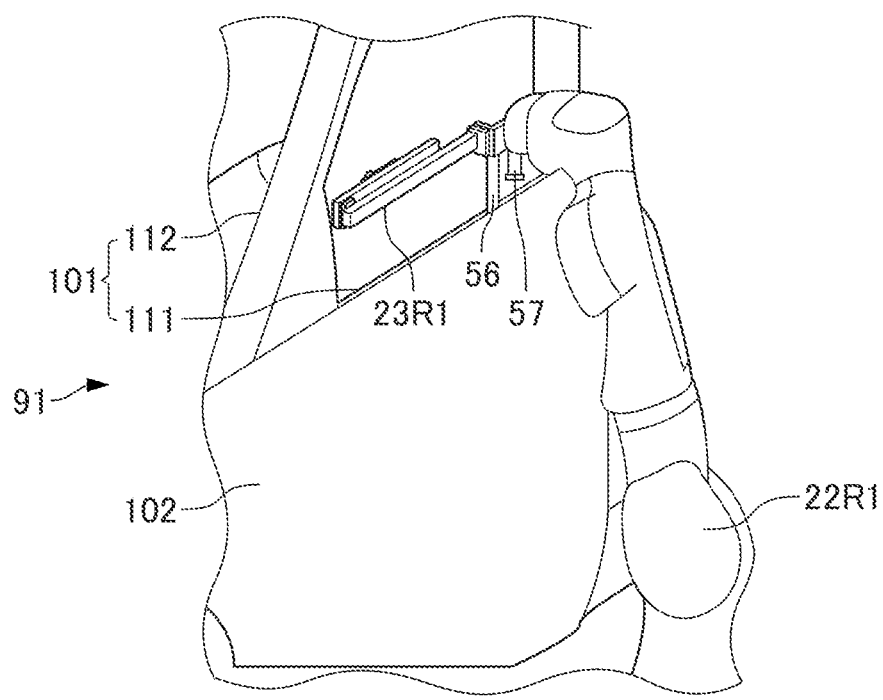
FIG. 4 is a view illustrating a schematic of a door opening action.

FIG. 4 is a view illustrating a schematic of the door opening action.

Figure 5:
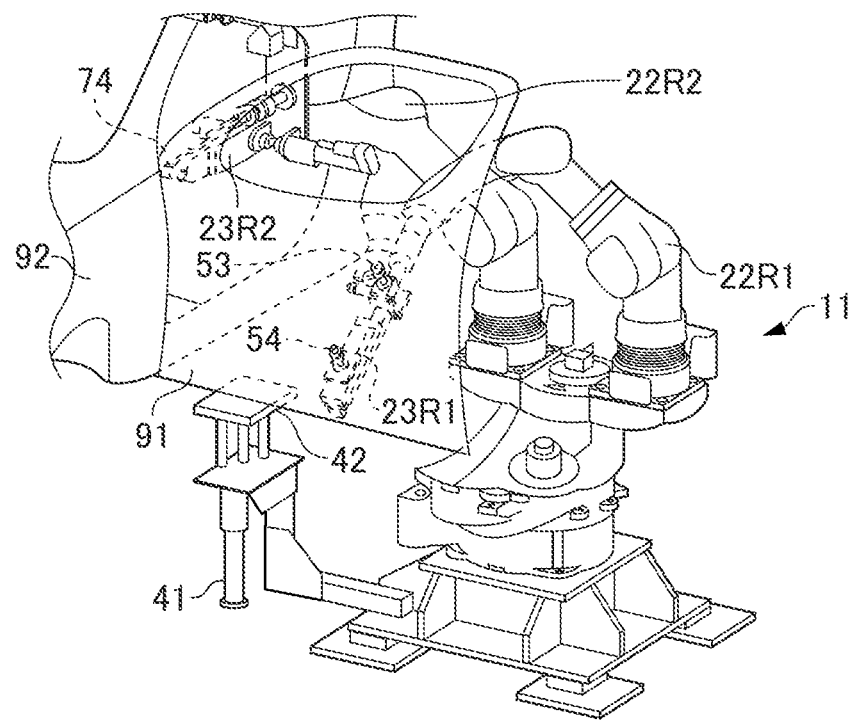
FIG. 5 is a view illustrating a schematic of a bolt loosening action.

FIG. 5 is a view illustrating a schematic of the bolt loosening action.

Figure 6:
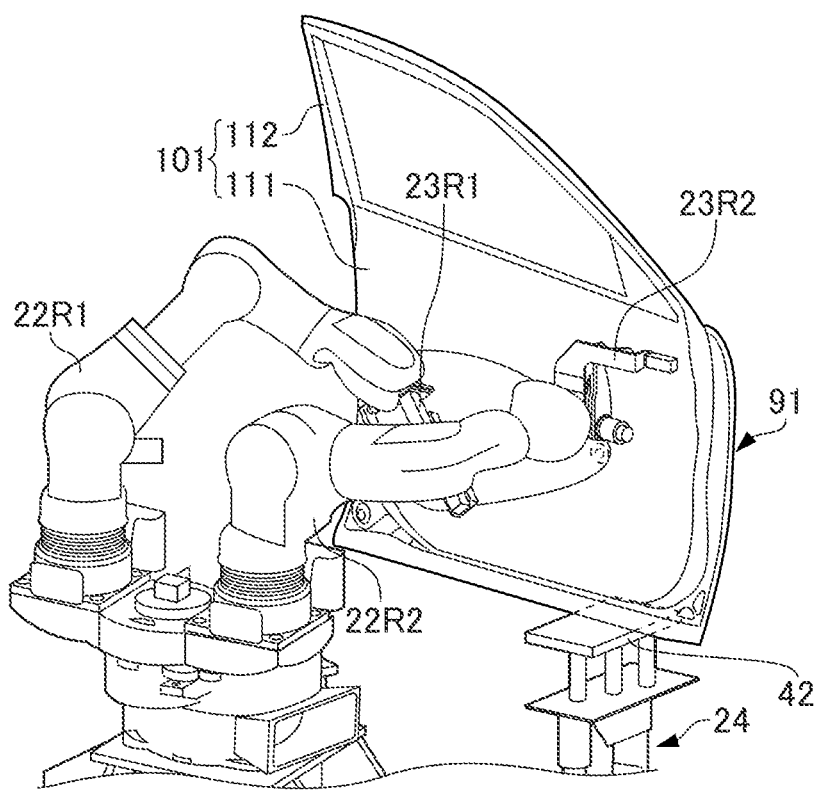
FIG. 6 is a view illustrating a schematic of a door holding and transporting action.

FIG. 6 is a view illustrating a schematic of the door holding and transporting action.

The initial state of the door removing process is a state in which a door 91 is closed as shown in FIG. 4, which is a state in which the body of a vehicle has been conveyed on a line, and is provided to the door removing system 1.

Herein, the door 91 is configured so that an inner panel 101 and an outer panel 102 are joined.

The inner panel 101 includes a panel main body 111 of a substantially flat rectangular shape, and a frame portion 112 of a substantially U-shape provided to an upper end of the panel main body 111. A region surrounded by the frame portion 112 and the upper side of the panel main body 111 forms an opening in which window glass that is not illustrated is exposed.

The outer panel 102 is installed at an exterior side of the panel main body 111 of the inner panel 101.

A gap for accommodating the window glass is formed between the upper side of the outer panel 102 and the upper side of the panel main body 111 of the inner panel 101.

Movement of the first arm 22R1 begins in the initial state such as that shown in FIG. 4, according to the control of the control unit 12 (FIG. 1). During this time, the sensor 57 of the first holding jig 23R1 installed to the first arm 22R1 tries to detect the insertion position of the door opening pin 56 on a door 91.

Although the insertion position of the door opening pin 56 is not particularly limited, in the present embodiment, it is set to be the gap between the upper side of the outer panel 102 of the door 91 and the upper side of the panel main body 111 of the inner panel 101.

When the sensor 57 detects the gap, the door opening pin 56 of the first holding jig 23R1 is inserted into this gap, and the door 91 is drawn to the outside of the body by the first arm 22R1. When this is done, the door 91 opens, and the lower side of the door 91 is exposed.

When the door opening action shown in FIG. 4 ends in this way, the bolt loosening action shown in FIG. 5 begins.

Although the details will be described later while referencing FIGS. 25 to 32, under the control of the control unit 12, the urethane pad 42 of the door H-receiving member 24 rises, latches to the lower part of the door 91, and holds the door so as to catch the door in a substantially vertically upward direction. In addition, under the control of the control unit 12, the first arm 22R1 moves, and the door holding pads 53 and 54 of the first holding jig 23R1 installed to the first arm 22R1 hold two points at the opening portion provided in the panel main body 111 of the inner panel 101 of the door 91.

During this time, the second arm 22R2 moves, and the bolt loosening tool 74 of the second holding jig 23R2 installed to the second arm 22R2 loosens and removes the bolt temporarily fixing the door 91 and the body 92, under the control of the control unit 12.

In other words, bolt loosening is performed by the second arm 22R2 in a state in which the door 91 is retained at the first arm 22R1 and the door H-receiving member 24.

When the bolt loosening action shown in FIG. 5 ends in this way, the door holding and transporting action shown in FIG. 6 begins.

Although the details will be described later while referencing FIGS. 19 to 24, under the control of the control unit 12, each of the door holding pads 53 and 54 of the first holding jig 23R1 installed to the first arm 22R1, and the door holding pad 72 of the second holding jig 23R2 installed to the second arm 22R2 respectively hold the three points at the opening portion provided to the panel main body 111 of the inner panel 101 of the door 91 (each apex of a triangle of a predetermined shape).

In this state, the first arm 22R1 and the second arm 22R2 operate in cooperation to transport the door 91. The door holding and transporting action shown in FIG. 6 ends when the door 91 is transported and delivered to a predetermined location. In other words, the entirety of the door removing process by way of the door removing system 1 ends.

In the foregoing, schematics of the actions of the door removing system 1 have been explained while referencing FIGS. 4 to 6. The details of the actions of the door removing system 1 will be further explained hereinafter.

First, the movement action of the dual arm robot 11 will be explained while referencing FIGS. 7 to 20.

Figure 7:
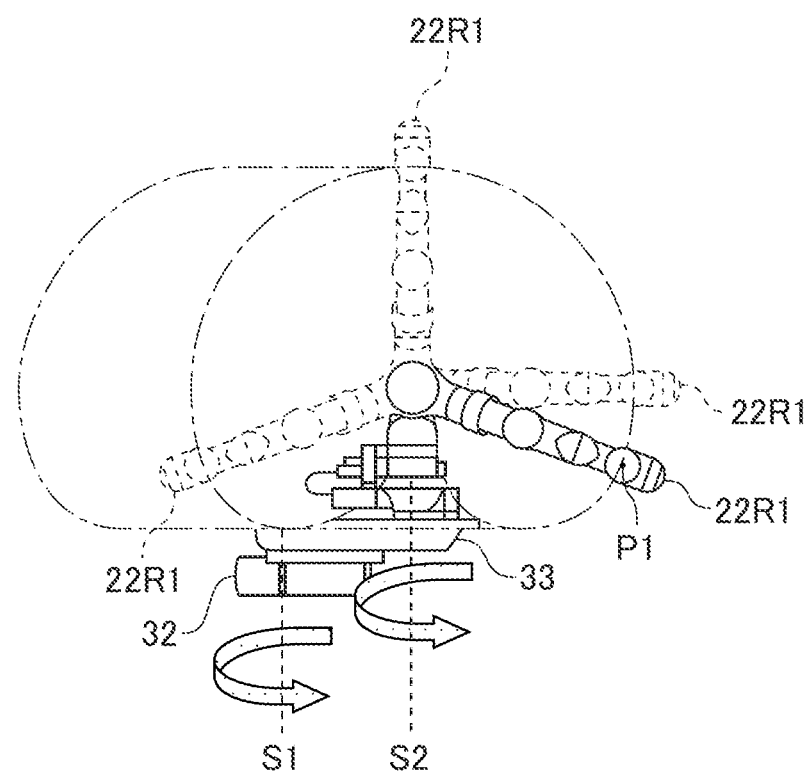
FIG. 7 is a side view of a top half of the dual arm robot when viewed from the first arm side, illustrating a trajectory of the first arm of the dual arm robot.

FIG. 7 is a side view of a top half of the dual arm robot 11 when viewed from the first arm 22R1 side, illustrating a trajectory of the first arm 22R1 of the dual arm robot 11.

Figure 8:
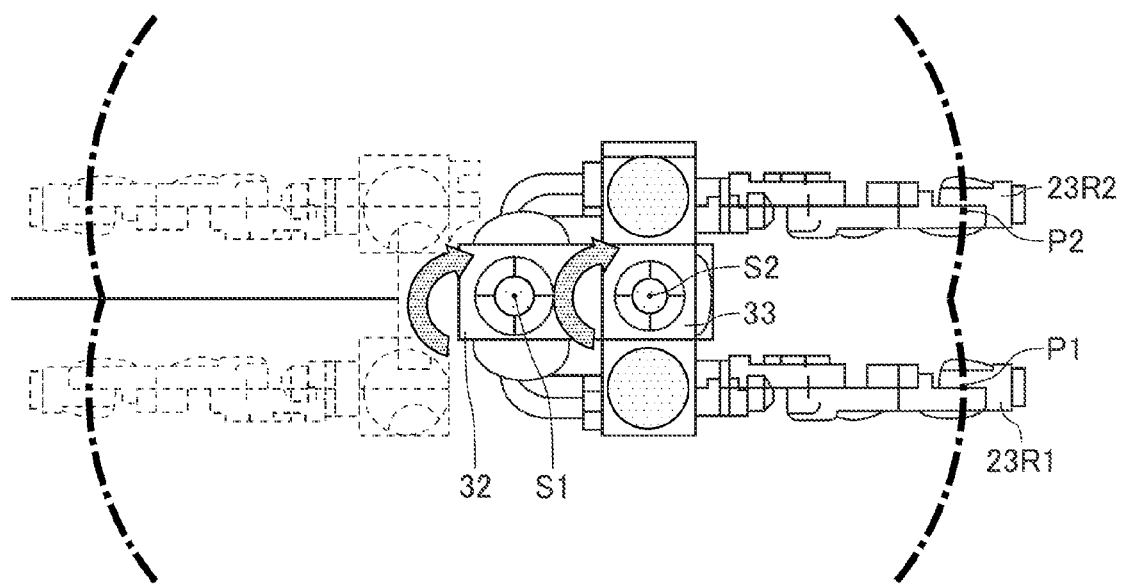
FIG. 8 is a top view of the dual arm robot, illustrating a trajectory of the first arm of the dual arm robot.

FIG. 8 is a top view of the dual arm robot 11, illustrating a trajectory of the first arm 22R1 of the dual arm robot 11.

As shown in FIGS. 7 and 8, the first arm 22R1 is able to rotate on axes independent from each other about each of the two shafts S1 and S2 that are in substantially vertical directions. As a result, the trajectories of moveable ranges of a point P1 of the first arm 22R1 and a point P2 of the second arm 22R2 are as shown by the dashed lines in FIG. 7 for the substantially vertical direction, and are as shown by the dashed lines in FIG. 8 for the substantially horizontal direction.

It should be noted that, although only the first arm 22R1 is illustrated in FIG. 7 for simplicity of explanation, the trajectory of moveable range in the substantially vertical direction is substantially the same as the point P1 of the first arm 22R1 for the point P2 of the second arm 22R2 as well, which is drivable independently from the first arm 22R1.

Figure 9:
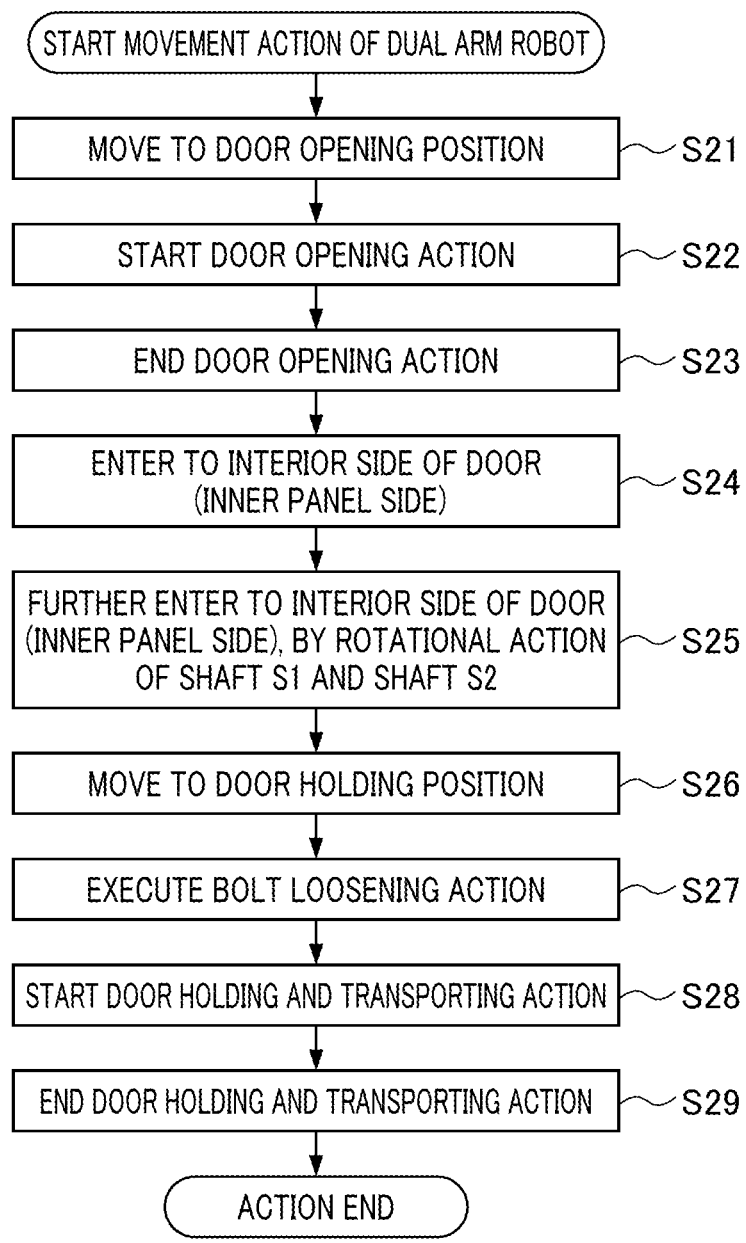
FIG. 9 is a flowchart illustrating movement actions of the dual arm robot in a door removing process.

FIG. 9 is a flowchart illustrating movement actions of the dual arm robot 11 in the door removing process.

Each of FIGS. 10 to 16 is a top view respectively showing the position and state of the dual arm robot 11 during the respective actions in each step of the flowchart shown in FIG. 9.

It should be noted that illustrations of the first holding jig 23R1 and the second holding jig 23R2 have been omitted from each of FIGS. 10 to 16 for simplifying the explanation.

In the door removing process, when the initial state described above using FIG. 4 has been entered, the movement action of the dual arm robot 11 begins under the control of the control unit 12.

In Step S21, the dual arm robot 11 moves to the door opening position.

Figure 10:
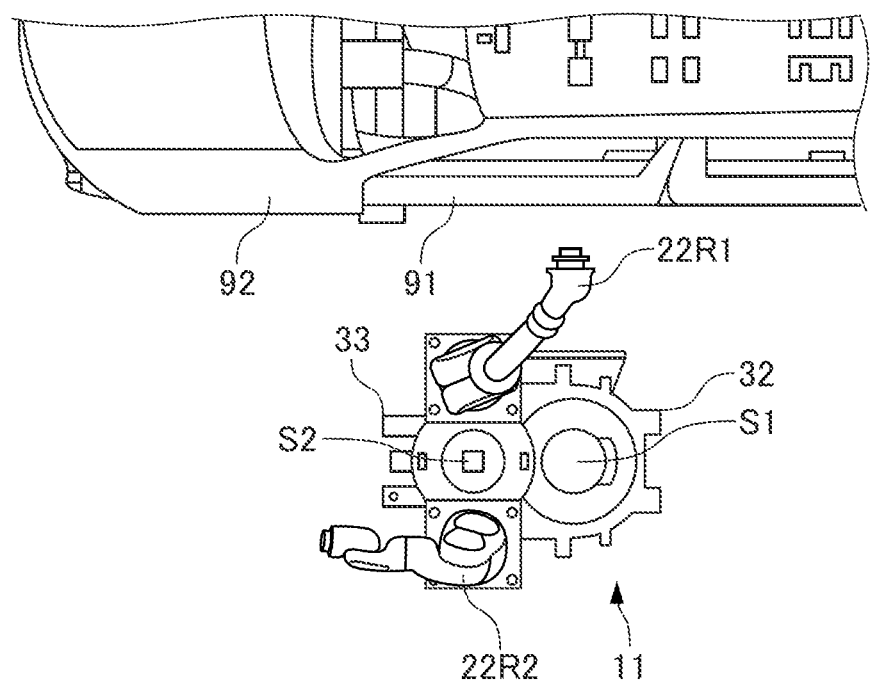
FIG. 10 is a top view showing the position and state of the dual arm robot during the respective actions of each step in the flowchart shown in FIG. 9.
Figure 11:
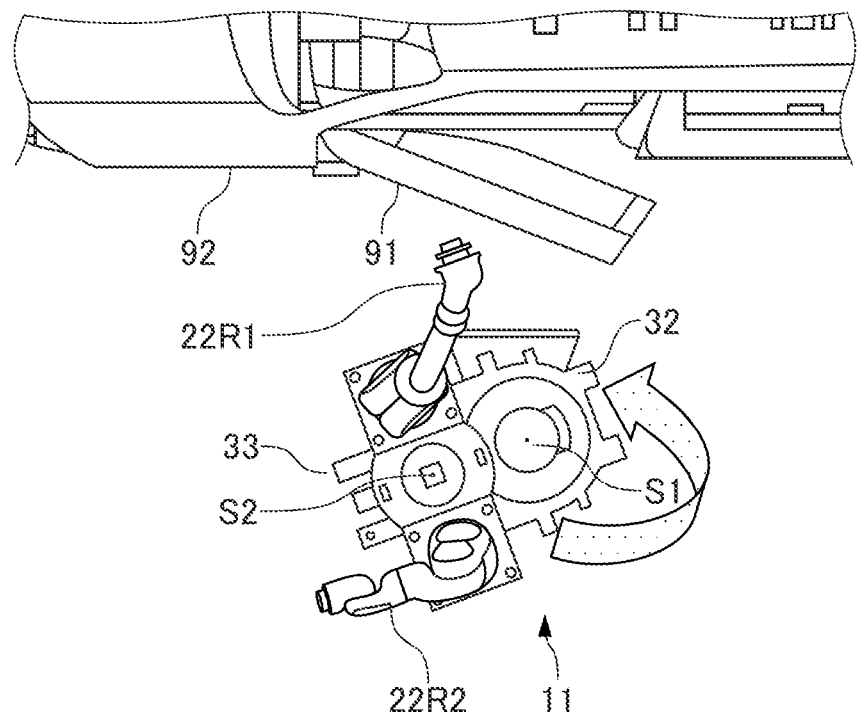
FIG. 11 is a top view showing the position and state of the dual arm robot during the respective actions of each step in the flowchart shown in FIG. 9.

Herein, the door opening position refers to a position at which the dual arm robot 11 is arranged as shown in FIG. 10, and the door opening action described above using FIG. 4 can be begun.

In Step S22, the dual arm robot 11 begins the door opening action described above using FIG. 4.

When this is done, the dual arm robot 11 opens the door 91 in an arc shape by combining the rotational action about the shaft S1 and the movement action of the first arm 22R1, as shown in FIG. 1.

In Step S23, the dual arm robot 11 ends the door opening action.

Figure 12:
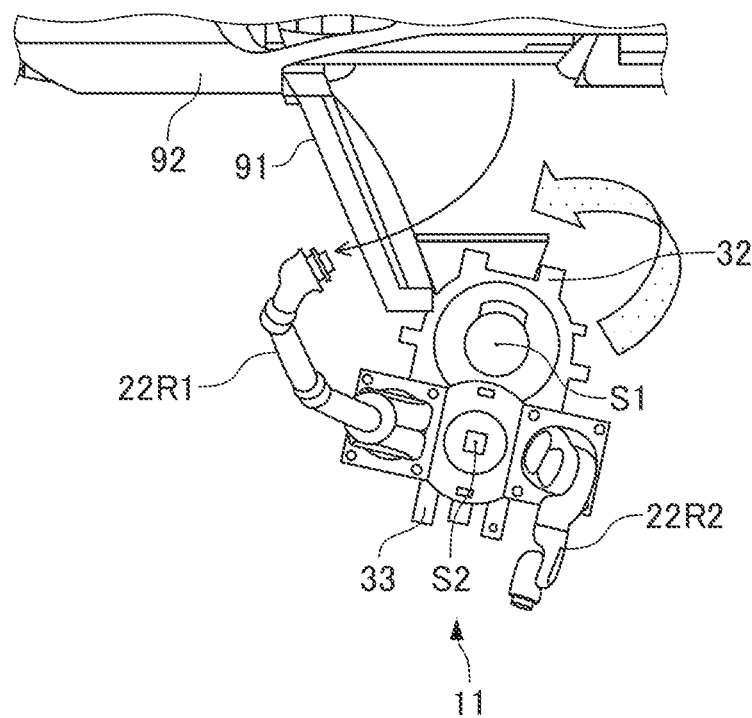
FIG. 12 is a top view showing the position and state of the dual arm robot during the respective actions of each step in the flowchart shown in FIG. 9.

At this stage, the dual arm robot 11 is moved up to the position shown in FIG. 12.

Figure 13:
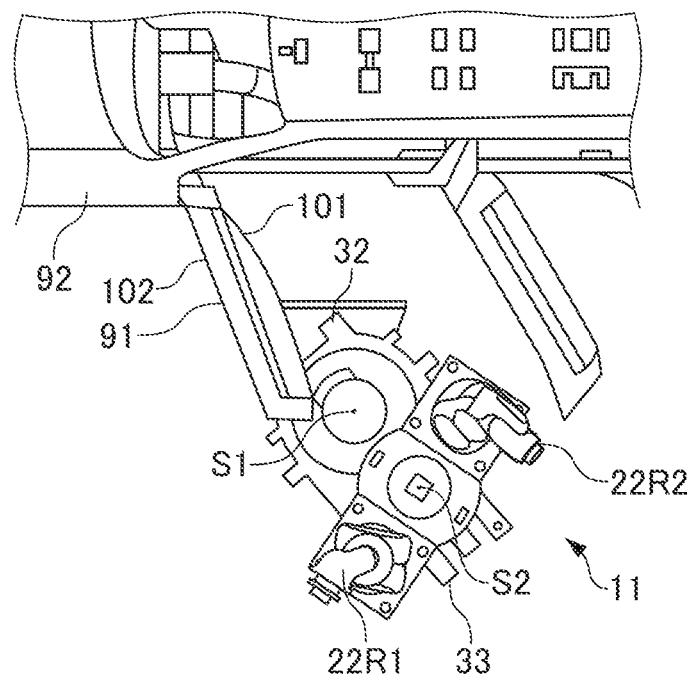
FIG. 13 is a top view showing the position and state of the dual arm robot during the respective actions of each step in the flowchart shown in FIG. 9.

Herein, in the present embodiment, it may be configured so that the same or a different dual arm robot 11 performs a similar door opening action so that front and rear two doors 91 are opened, as shown in FIG. 13.

In this case, the dual arm robot 11 cannot start the bolt loosening action if not entering into a narrow part between the front and rear two doors 91.

Therefore, the dual arm robot 11 enters into the narrow part between the front and rear two doors 91 by carrying out the movement actions of the next Steps S24 and S25 prior to starting the bolt loosening action.

In other words, in Step S24, the dual arm robot 11 enters to interior side of the door 91 (inner panel 101 side) as shown in FIG. 13.

Figure 14:
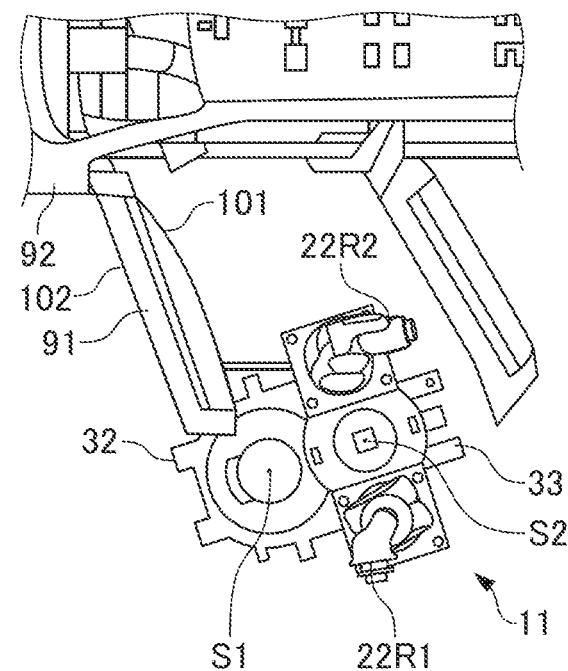
FIG. 14 is a top view showing the position and state of the dual arm robot during the respective actions of each step in the flowchart shown in FIG. 9.

In Step S25, the dual arm robot 11 further enters to the interior side of the door 91 (inner panel 101 side) by combining the rotational action about the shaft S1 and the rotational action about the shaft S2, as shown in FIG. 14.

Figure 15:
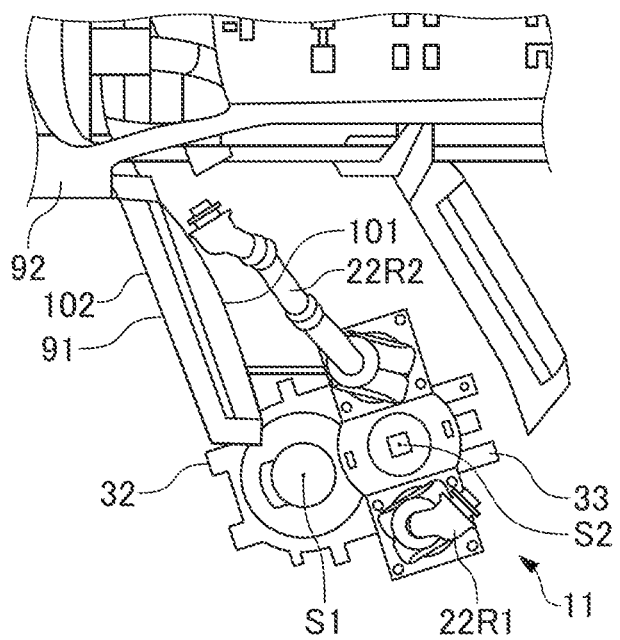
FIG. 15 is a top view showing the position and state of the dual arm robot during the respective actions of each step in the flowchart shown in FIG. 9.

In Step S26, when having moved to the door holding position shown in FIG. 15, the dual arm robot 11 stops the rotational action about the shaft S1 and the rotational action about the shaft S2.

Herein, the door holding position refers to a position at which the dual arm robot 11 is arranged as shown in FIG. 15, and the bolt loosening action described above using FIG. 5 and the door holding and transporting action described above using FIG. 6 can be begun.

In Step S27, the dual arm robot 11 performs the bolt loosening action described above using FIG. 5.

In Step S28, the dual arm robot 11 begins the door holding and transporting action described above using FIG. 6.

When this is done, the dual arm robot 11 moves along a trajectory opposite from during the movement actions of Steps S24 and S25, by combining the rotational action about the shaft S1 and the rotational action about the shaft S2.

Figure 16:
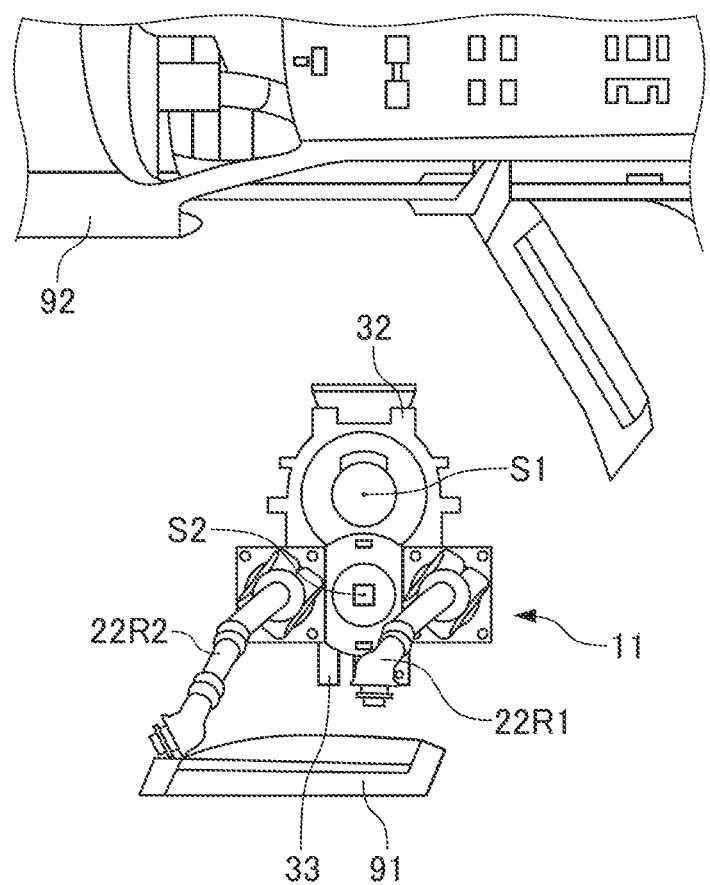
FIG. 16 is a top view showing the position and state of the dual arm robot during the respective actions of each step in the flowchart shown in FIG. 9.

In Step S29, the dual arm robot 11 ends the door holding and transporting action by moving to the position shown in FIG. 16, and transferring the door 91 to a conveyor hanger not illustrated.

The entirety of the door removing process thereby reaches completion as well.

Figure 17:
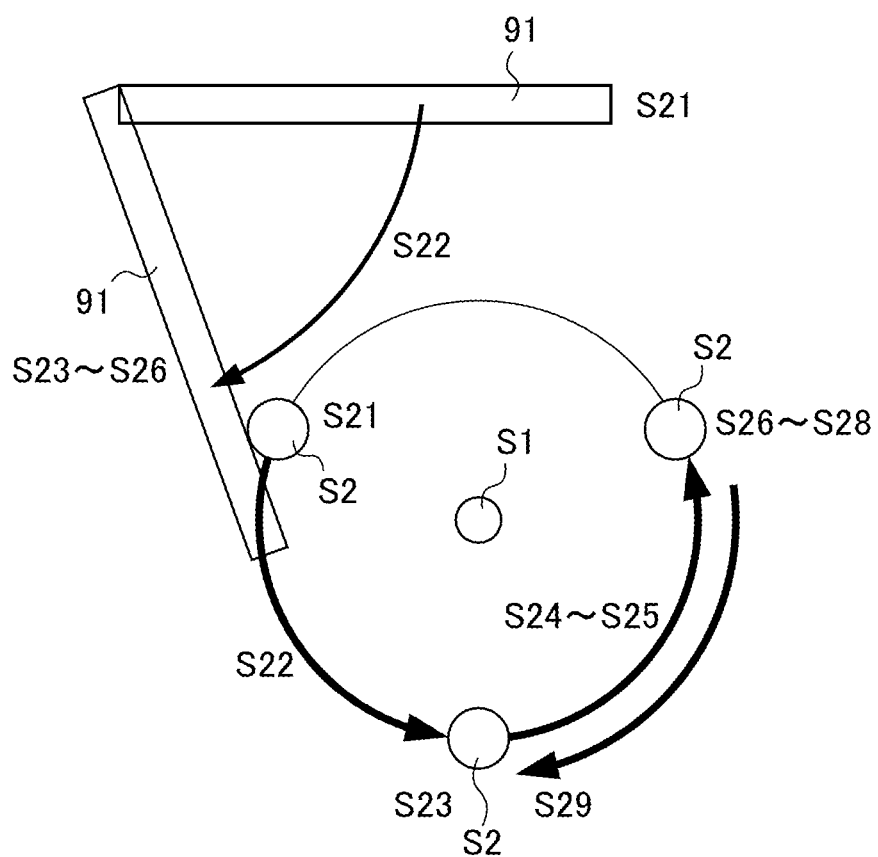
FIG. 17 is a top view showing the positional relationships between an S1 shaft, S2 shaft and the door when the dual arm robot undergoes movement actions according to the flowchart shown in FIG. 9.

FIG. 17 is a top view showing a positional relationship between the shaft S1, shaft S2 and door 91 in a case of the dual arm robot 11 undergoing a movement action according to the aforementioned flowchart of FIG. 9.

As shown in FIG. 17, at the stage of actions from Steps S21 to S26, the rotational action of the shaft S1 is a counterclockwise action. During this time, the rotational action of the shaft S2 is performed independently as appropriate.

Then, the rotational action of the shaft S1 temporarily stops at the stage of actions from Steps S26 to S28, and subsequently becomes a clockwise action in the stage of actions from Steps S28 to S29. During this time, the rotational action of the shaft S2 is performed independently as appropriate.

Herein, the differences between the actions of the dual arm robot 11 of the present embodiment and the actions of a conventional robot in the door removing process will be explained.

As the operations in the door removing process, there exists the operation of opening the closed door 91, the operation of unfastening the bolts from the opened door 91, and the operation of holding and transporting the door 91 from the inner side (inner panel 101 side).

In a case of automating each of such operations, the actions of the robot (dual arm robot 11 in the present embodiment) being generally classified into the three categories of a door opening action corresponding to the operation of opening a closed door 91, a bolt loosening action corresponding to the operation of unfastening the bolts from the opened door 91, and a door holding and transporting action corresponding to the operation of holding and transporting the door 91 from the inside (inner panel 101 side) is as described above.

Figure 18:
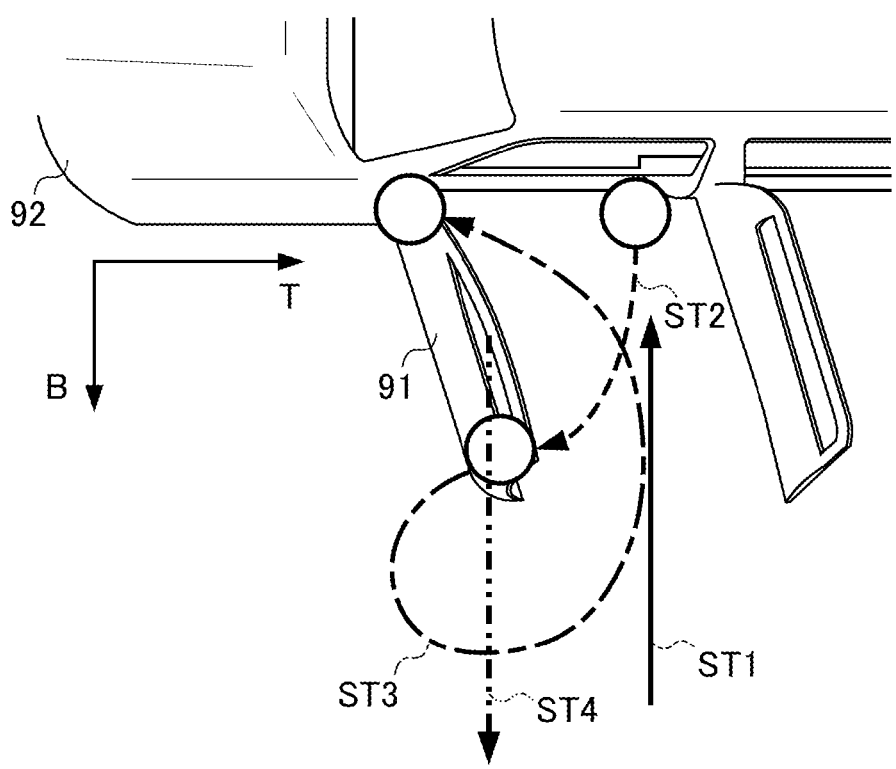
FIG. 18 is a top view showing a schematic of a trajectory of a robot in the door removing process.

In order to allow these three classifications of actions, i.e. all of the door opening action, bolt loosening action and door holding and transporting action, to be performed with the same robot, the actions shown in FIG. 18 become necessary.

FIG. 18 is a top view showing a schematic of the trajectory of the robot in the door removing process.

In Step ST1, the robot moves on the trajectories shown by the arrow of the solid line in FIG. 18 to the skin side (outer panel 102 side) of the closed door 91.

In Step ST2, the robot performs the action to open the door 91 on the trajectory shown by the arrow of the dotted line in FIG. 18. Such an action in Step ST2 corresponds to the door opening action.

Next, in Step ST3, the robot moves so as to enter to the interior side (inner panel 101 side) of the opened door 91 on the trajectory shown by the arrow of the dashed line in FIG. 18.

Then, the robot performs the bolt loosening action, followed by beginning the door holding and transporting action.

When this is done, in Step ST4, the robot moves while holding the door 91 on the trajectory shown by the arrow of the two-dot dashed line in FIG. 18, and transfers the door 91 to a door hanger not illustrated.

In the prior art, a shift base that allows the robot to move in each of a transport direction of the body 92 of the vehicle (hereinafter referred to as "T direction" as illustrated in FIG. 18) and a direction perpendicular to the T direction in a horizontal plane (hereinafter referred to as "B direction" as illustrated in FIG. 18) has been installed. Such a shift base in itself has become a large member.

In this case, among the movements of the robot, the movement in Step ST2 (movement on the trajectory shown by the arrow of the dotted line), and the movement in Step ST3 (movement on the trajectory shown by the arrow of the dashed line) are arc-like movements; therefore, there has been a problem of long cycle times.

In contrast, with the dual arm robot 11 of the present embodiment, the first arm 22R1 and second arm 22R2 are rotated by the shaft S1 and shaft S2, respectively, which are external shafts for these.

By rotating using the shaft S1, the door opening action is thereby realized (Step ST2 in FIG. 18, Steps S22 and S23 in FIG. 9).

Then, by rotating using the shaft S1 and shaft S2, the movement to enter to the interior side (inner panel 101 side) of the door 91 for performing the bolt loosening action is realized (Step ST3 in FIG. 18, Steps S24 and S25 in FIG. 9). The movement in this case is movement so as to face the direction of the door 91, as described in the foregoing using FIGS. 12 to 15.

As a result, when moving to the door holding position (Step S26 in FIG. 9), the dual arm robot 11 comes to be an attitude facilitating performing the bolt loosening action; therefore, it becomes possible to achieve shortening of the cycle time.

The following such technique is applied as the way of opening the door of the body of the vehicle in the door removing system 1 as explained in the foregoing.

More specifically, the dual arm robot 11 of the door removing system 1 of the present embodiment includes:

the first arm 22R1 to which the first holding jig 23R1 is connected as a tool for opening the door;

the second arm 22R2 to which the second holding jig 23R2 is connected as another tool for opening the door; and the robot main body 21 has a pedestal to which this first arm 22R1 and second arm 22R2 are installed.

The rotational shaft S1 of a direction substantially perpendicular to the ground, and the rotational shaft S2 positioned to be offset in the ground direction relative to the rotational shaft S1 are provided to the robot main body 21.

In this case, the dual arm robot 11 holds the door from the outside using the first arm 22R1 and the second arm 22R2, opens the door by causing the rotational shaft S1 to rotate, and causes the rotational shaft S1 to further rotate to cause the robot main body 21 to move to the interior side of the opened door, together with causing the rotational shaft S2 to rotate so that the first arm 22R1 and second arm 22R2 face the front side relative to work place for the door (place at which the operations of holding and loosening the bolts are performed).

In the present embodiment, it is thereby possible to exert the effects of the following (1) and (2).

(1) Movement of the robot becomes possible by simply providing the two rotational shafts S1 and S2. Therefore, the installation location of the door removing system 1 is reduced in size.

(2) When opening of the door has finished, the dual arm robot 11 comes to be at an attitude at which the operations on the door are facilitated. Therefore, the cycle time is shortened.

In the foregoing, the movement actions of the dual arm robot 11 have been explained as one of the details of the actions of the door removing system 1, by referencing FIGS. 7 to 18.

Next, the technique of 3-point holding of the door in the door holding and transporting action (refer to FIG. 6) will be explained by referencing FIGS. 19 to 24 as another one of the details of the actions of the door removing system 1.

Figure 19:
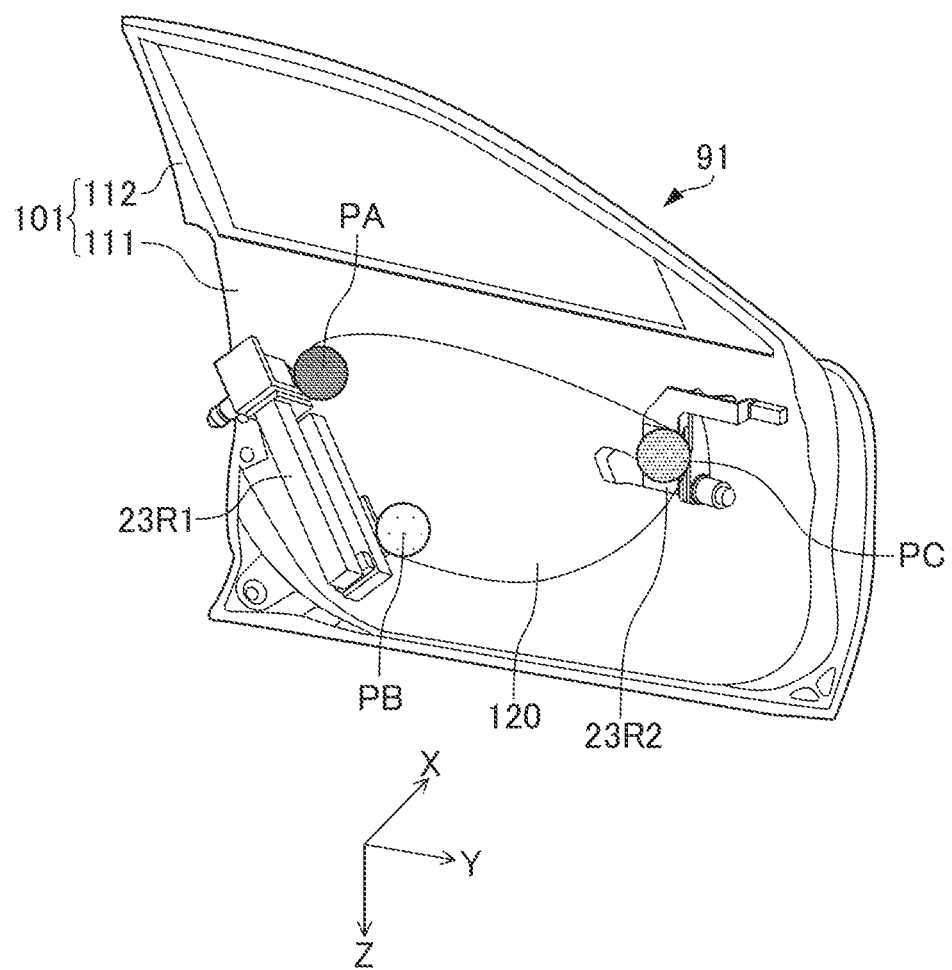
FIG. 19 is a perspective view of a schematic exterior configuration of a door viewed from an interior side, illustrating a technique of 3-point holding of a door in the door holding and transporting action of the door removing system.

FIG. 19 is a perspective view of a schematic exterior configuration of a door viewed from an interior side, illustrating the technique of 3-point holding of a door in the door holding and transporting action of the door removing system 1.

As shown in FIG. 19, under the control of the control unit 12, each of the door holding pads 53 and 54 of the first holding jig 23R1 and the door holding pad 72 of the second holding jig 23R2 respectively holds the three points PA, PB and PC of an opening portion 120 provided at the panel main body 111 of the inner panel 101 of the door 91.

Figure 20:
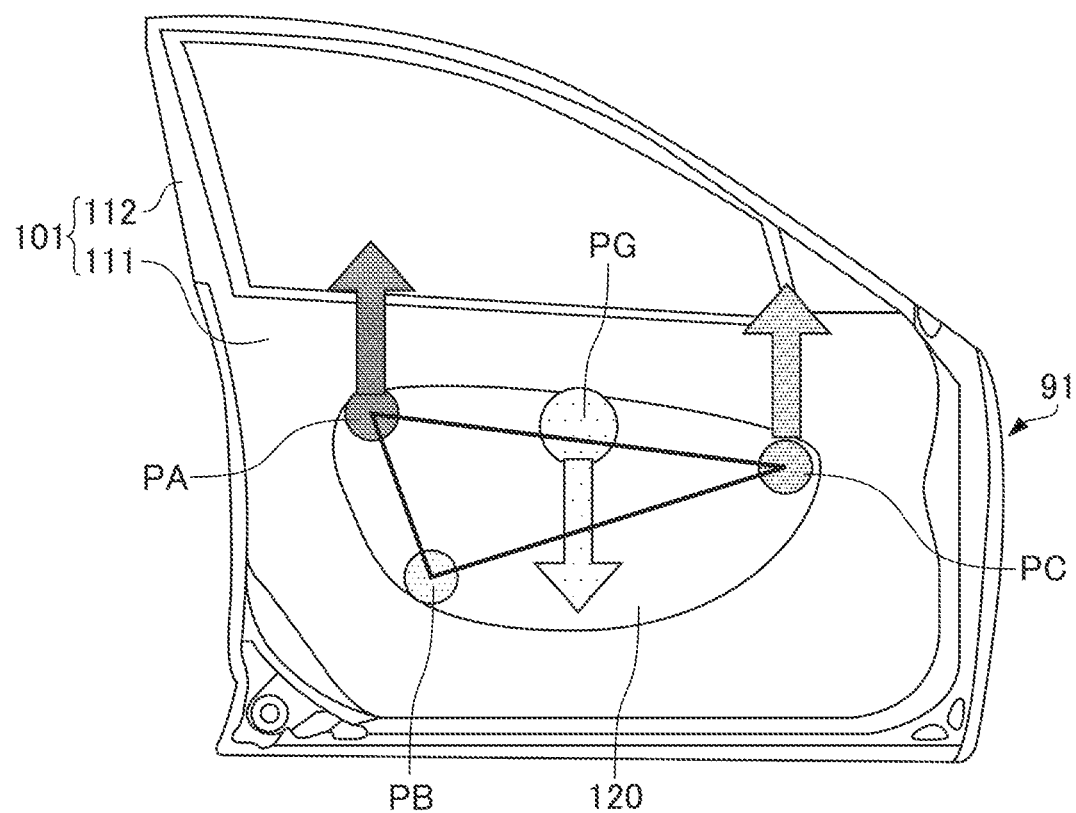
FIG. 20 is a perspective view of a schematic exterior configuration of a door viewed from an interior side, illustrating a force relationship of the 3-point holding positions of the door in the door holding and transporting action of the door removing system.

FIG. 20 is a perspective view of a schematic exterior configuration of a door viewed from an interior side, illustrating a force relationship of the 3-point holding positions of the door in the door holding and transporting action of the door removing system 1.

Figure 21:
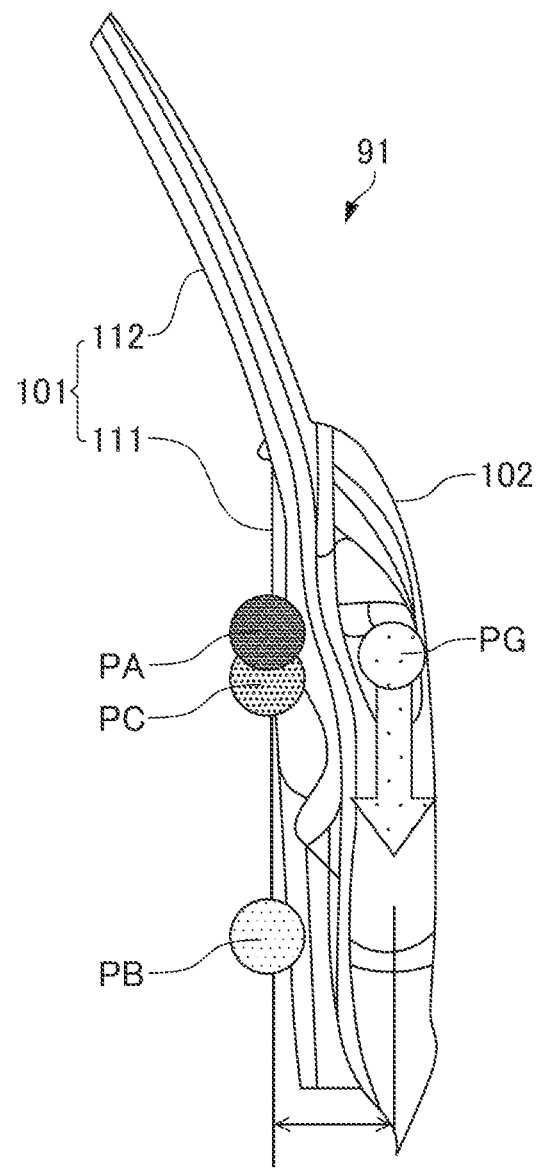
FIG. 21 is a cross-sectional view of a schematic configuration of a door viewed from a forward side, illustrating a force relationship of the 3-point holding positions of the door in the door holding and transporting action of the door removing system.

FIG. 21 is a cross-sectional view of a schematic configuration of a door viewed from a forward side, illustrating a force relationship of the 3-point holding positions of the door in the door holding and transporting action of the door removing system 1.

As shown in FIGS. 20 and 21, the weight of the door 91 is supported by each of the door holding pads 53 and 72 holding at the two points of point PA and point PC at the opening portion 120, respectively. In other words, the position of the point PG is a center of gravity position of the door 91, and a force of approximately half the weight of the door 91 is loaded on each of the point PA and the point PC, respectively.

Then, shaking of the door 91 is suppressed by the door holding pad 54 holding at the point PB of the opening portion 120.

More specifically, the door holding pad 53 holds the door 91 so as to support the force in the direction of gravitational force by abutting at the point PA, which is an end on the upper side of the opening portion 120.

Herein, the direction of gravitational force is called the "Z direction" as shown in FIG. 19, the direction parallel to the T direction in FIG. 18 (transport direction of the body 92 of the vehicle) is called the "X direction", and a direction horizontal to the B direction in FIG. 18 is called the "Y direction".

In this case, the point PA is established at an end of the opening portion 120 in the Y direction; therefore, the inertia force during transport of the door 91 is received thereat. Therefore, the point PA is preferably set to a position as high as possible in the Z direction.

The door holding pad 54 holds the door 91 so as to receive the force in the Y direction by abutting at the point PB, which is an end in the Y direction of the opening portion 120.

In this case, the point PB is a load bearing, and is set to a position receiving the moment generated by the door holding pad 53 holding at the point PA. In addition, the point PB is preferably set to a position as low as possible in the Z direction.

The door holding pad 72 holds the door 91 so as to support the force in the direction of gravitational force by abutting at the point PC, which is an end on the upper side of the opening portion 120.

In this case, the point PC is set to an end of the opening portion 120 in the –Y direction, and thus receives the inertia force during transporting of the door 91. Therefore, the point PC is preferably set to a position as high as possible in the Z direction.

In addition, the point PC is set as to as interpose the center of gravity (point PG) with the point PA. More specifically, the position of the load bearing by the point PC is a position interposing the center of gravity with the point PA.

In other words, it is possible to freely arrange the door holding pads 53 and 54, and the door holding pad 72 at any position, by the first arm 22R1 and the second arm 22R2, respectively.

Therefore, although only the holding of the door 91 of a predetermined vehicle model is referenced here, so long as the door has an opening portion on the inner panel side, it is possible to similarly apply the technique of 3-point holding of the door of the present embodiment (refer to FIGS. 19 to 21) by setting the point PA, point PB and point PC as explained above, irrespective of the vehicle model.

However, in this case, the model-switching shift member 55 of FIG. 2 allows the position of the door holding pad 54 to move along the longitudinal direction of the frame 52 by sliding in the longitudinal direction of the frame 52, depending on the vehicle model of the vehicle. In other words, the model-switching shift member 55 varies the separation distance between the door holding pads 53 and 54 in the longitudinal direction of the frame 52 to vary within a range from a distance LA to a distance LB according to the vehicle model of the vehicle.

Figure 22:
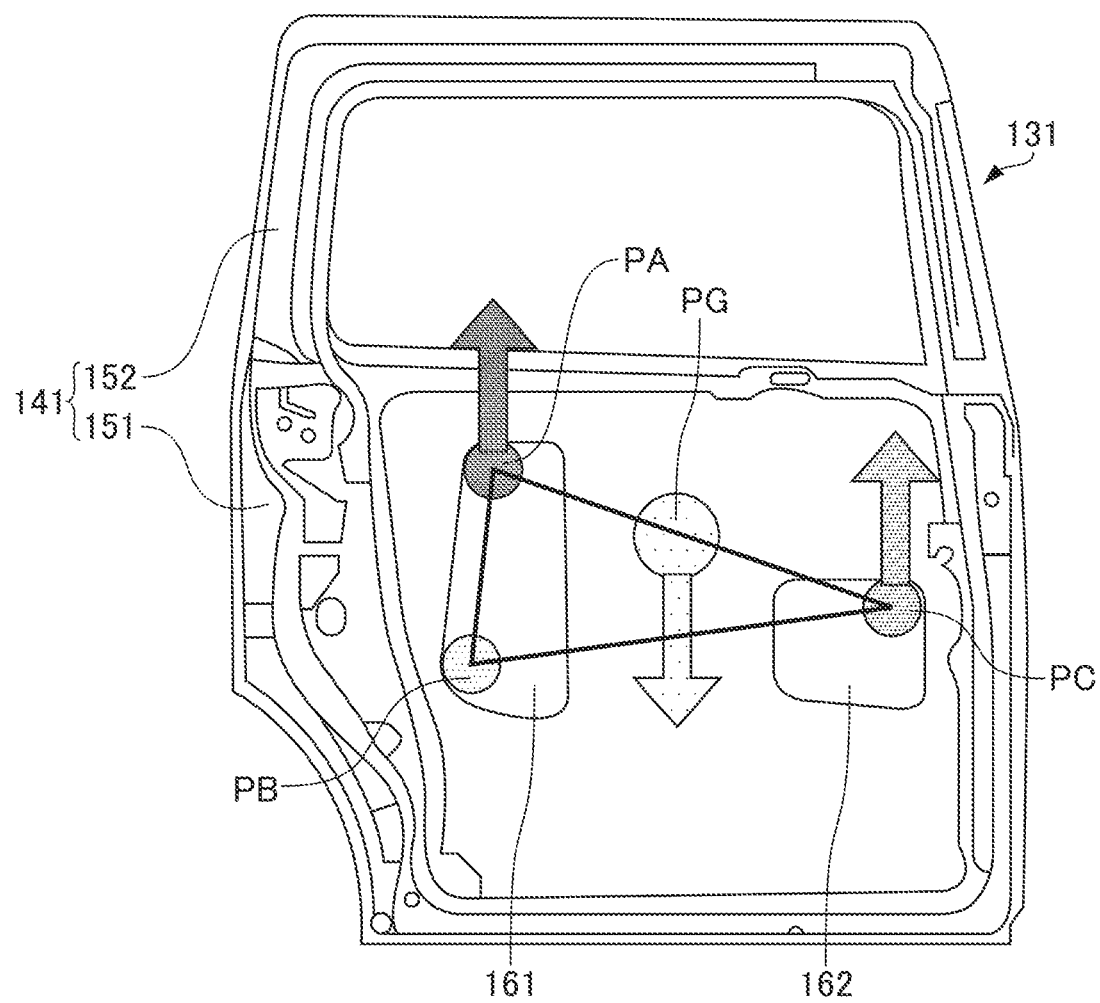
FIG. 22 is a perspective view of a schematic exterior configuration in a case of viewing a door of a different model than that of FIG. 20 from an interior side, illustrating a force relationship of the 3-point holding positions of the door in the door holding and transporting action of the door removing system.

FIG. 22 is a perspective view of a schematic exterior configuration in the case of viewing the door of a different vehicle model than that of FIG. 20 from an interior side, illustrating the force relationship of the 3-point holding positions in the door holding and transporting action of the door removing system 1.

Figure 23:
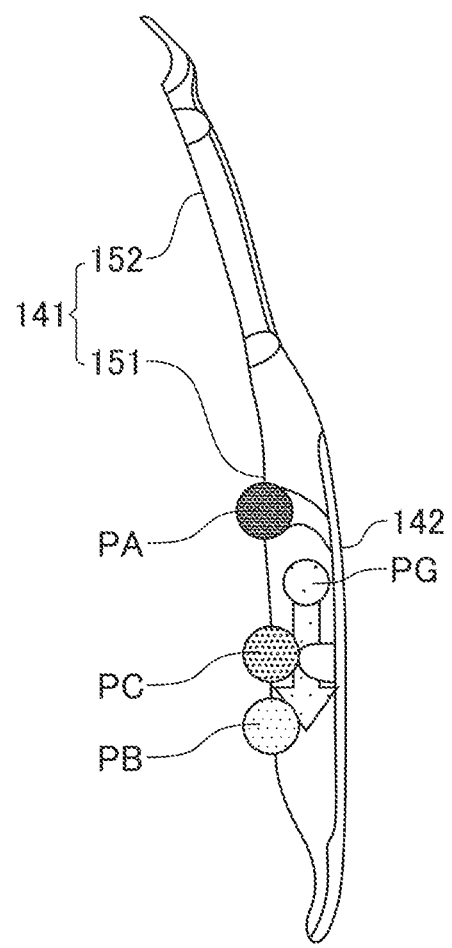
FIG. 23 is a cross-sectional view of a schematic configuration in a case of viewing the door of the vehicle model of FIG. 22 from a forward side, illustrating the force relationship of the 3-point holding position of the door in the door holding and transporting action of the door removing system.

FIG. 23 is a cross-sectional view of a schematic configuration in a case of viewing the door of the vehicle model of FIG. 22 from a forward side, illustrating the force relationship of the 3-point holding positions of the door in the door holding and transporting action of the door removing system 1.

Herein, the door 131 shown in FIGS. 22 and 23 is the door of a vehicle model differing from the door 91, and is configured so that an inner panel 141 and an outer panel 142 are joined.

The inner panel 141 includes a panel main body 151 of a substantially flat rectangular shape, and a frame portion 152 of a substantially U-shape provided to an upper end of the panel main body 151. A region surrounded by the frame portion 152 and the upper side of the panel main body 151 forms an opening in which window glass that is not illustrated is exposed.

Two opening portions 161 and 162 are provided in the inner panel 141.

The outer panel 142 is installed at an exterior side of the panel main body 151 of the inner panel 141.

A gap for accommodating the window glass is formed between the upper side of the outer panel 142 and the upper side of the panel main body 151 of the inner panel 141.

The weight of the door 131 is supported by each of the door holding pad 53 holding at the point PA of the opening portion 161 and the door holding pad 72 holding at the point PC of the opening portion 162, respectively. In other words, the position of the point PG is the center of gravity of the door 131, and a force of approximately half the weight of the door 131 is loaded on each of the point PA and the point PC, respectively.

Then, shaking of the door 131 is suppressed by the door holding pad 54 holding at the point PB of the opening portion 161.

More specifically, the door holding pad 53 holds the door 131 so as to support the force in the direction of gravitational force by abutting at the point PA, which is an end on the upper side of the opening portion 161.

The door holding pad 54 holds the door 131 so as to receive the force in the Y direction by abutting at the point PB, which is an end on the lower side in the Y direction of the opening portion 161.

The door holding pad 72 holds the door 131 so as to support the force in the direction of gravitational force by abutting at the point PC, which is an end on an upper side of the opening portion 162.

Herein, for the technique of 3-point holding of a door in the door holding and transporting action in the door removing process, the differences between the technique of the present embodiment and the conventional technique will be explained.

According to the conventional technique, pins are inserted into pin holes at three points arranged in the door (work) at a predetermined pitch, whereby the door is stabilized, and the weight of a door is held with the pin clamps, clamps or the like. In the conventional technique, it is configured so as to eliminate the model differences in the depth of the pin holes by employing a serrated chuck having convexities and concavities.

With such a conventional technique, the following such first to third problems have arisen.

The first problem is the problem of the 3-point hole positions must be precisely known in order to make the pins fit into the pin holes at the 3-points, i.e. the problem in that the door position must be positioned prior to sensing and holding.

The second problem is the problem of, the door after painting is the target in the door removing process, and there must be deformation in the door after such painting upon inserting the pins and upon clamping.

The third problem is the problem of a heavy clamping device such as a pin clamp or chuck becoming necessary.

In contrast, it is possible to eliminate these conventional first to third problems by applying the technique of 3-point holding of the present embodiment described above using FIGS. 19 to 21.

In other words, the opening portion 120 is provided in the door 91 for reasons such as for interior part installation. Each of the three points PA, PB and PC of this opening portion 120 can stably retain the door 91 (FIG. 20, etc.) or the door 131 (FIG. 22, etc.) serving as the work, with the door holding pads 53, 54 and 72, respectively. The three points of the pin holes, which were conventionally required, are thereby no longer necessary, and thus the first problem and the second problem are overcome.

In addition, the door holding pads 53 and 54 are provided to the first holding jig 23R1 as the end effector of the first arm 22R1, and the door holding pad 72 is provided to the second holding jig 23R2 as the end effector of the second arm 22R2. It thereby becomes possible to hold the door 91 (FIG. 20, etc.) or door 131 (FIG. 22, etc.) according to the arrangement of the door holding pads 53, 54 and 72. In other words, although there are specification differences between the opening portions of every model (refer to the difference between the one opening portion 120 in FIG. 20 and the two opening portions 161 and 162 in FIG. 22), it is possible to hold the door of every model with good balance so as to surround the position of the center of gravity by the door holding pads 53, 54 and 72 with the dual arms of the first arm 22R1 and the second arm 22R2. Therefore, a heavy clamping device such as a pin clamp or chuck, which has been conventionally required, is no longer necessary, and the load on the door 91 decreases. In other words, the third problem is solved.

Figure 24:
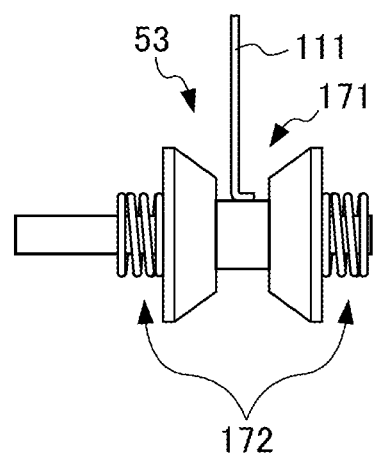
FIG. 24 is a side view showing a schematic exterior configuration of a door holding pad.

Herein, the door holding pads 53, 54 and 72 have the shape shown in FIG. 24.

FIG. 24 is a side view showing a schematic exterior configuration of the door holding pad.

It should be noted that, although only the shape of the door holding pad 53 is illustrated in FIG. 24, the shapes of the door holding pads 54 and 72 are also as shown in FIG. 24.

The door holding pads 53, 54 and 72 have a holding part 171 and floating mechanisms 172.

The holding part 171 is made of MC nylon (registered trademark), and has a cylindrical shape of a "hand drum" for Japanese traditional music, i.e. a shape in which the upper surfaces (smaller circular surface) of two circular truncated cones join. A concaved part is formed at this joining part, and the panel main body 111 (opening portion 120) of the door 91 is latched in this concaved part. It should be noted that, although only the panel main body 111 is illustrated in FIG. 24, the panel main body of every model (e.g., the panel main body 151 having the two opening portions 161 and 162 shown in FIG. 22, etc.) can understandably also be latched in this concaved part. In this way, the holding part 171 is configured so as to be able to handle the shape of the opening portion 120 by having a cylindrical shape.

The floating mechanisms 172 are configured so as to be able to handle variation between works (door 91, door 131, etc.), by having elastic bodies provided so as to contact with each of the lower surfaces of these two circular truncated cones, on a shaft piercing the lower surfaces of the two circular truncated cones of the holding part 171.

In the foregoing, the technique of 3-point holding of a door in the door holding and transporting action (refer to FIG. 6) has been explained while referencing FIGS. 19 to 24.

Next, among the actions of the dual arm robot 11 in the door removing process, the details of the bolt loosening action (refer to FIG. 5) and the door holding and transporting action (refer to FIG. 6) will be explained while referencing FIGS. 25 to 27.

In the bolt loosening action, since the bolt loosening tool 74 provided to the second holding jig 23R2 is used, as shown in FIG. 6, it is not possible to use the door holding pad 72 provided to the second holding jig 23R2. In other words, the technique of 3-point holding of a door described above by referencing FIGS. 19 to 24 cannot be applied.

Figure 25:
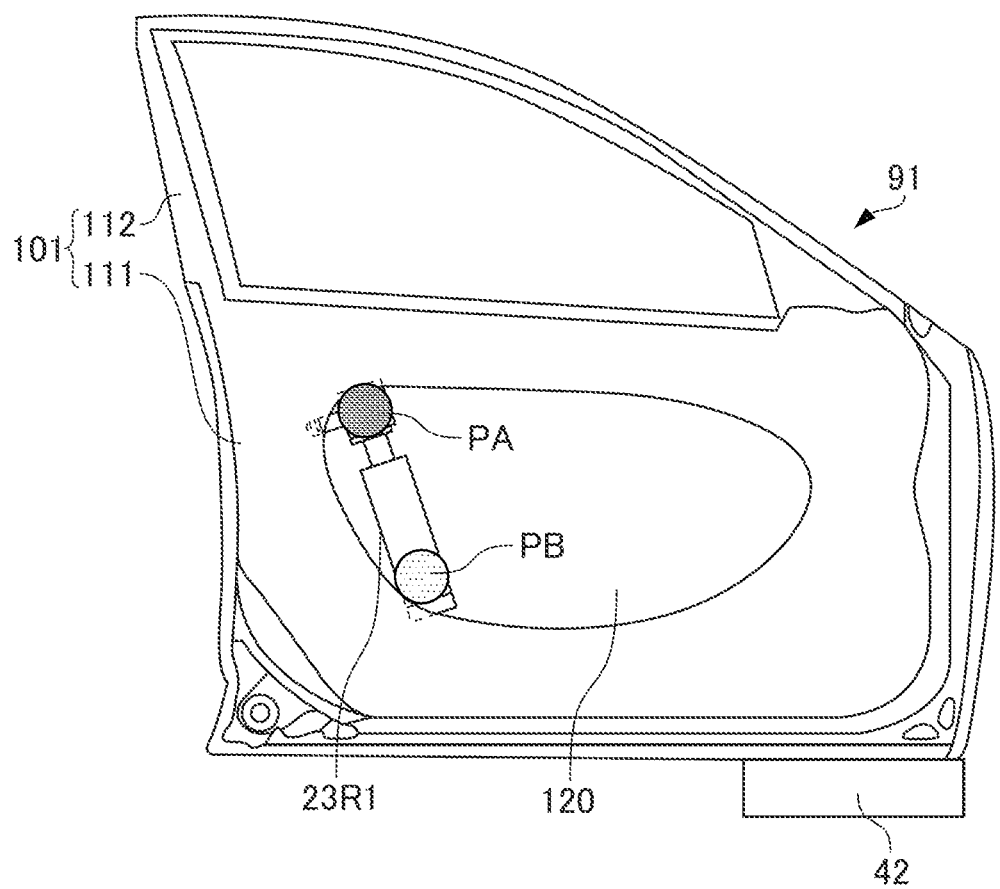
FIG. 25 is a side view showing a schematic exterior configuration of a door in a case of viewing from an interior side, illustrating a technique of holding the door in the bolt loosening action.

Therefore, in the present embodiment, the technique of holding a door such as that shown in FIG. 25 is applied in the bolt loosening action.

FIG. 25 is a side view showing a schematic exterior configuration of a door in a case of viewing from an interior side, illustrating a technique of holding the door in the bolt loosening action.

As shown in FIG. 25, in the bolt loosening action, the door holding pads 53 and 54 of the first holding jig 23R1 respectively hold at the points PA and PB of the opening portion 120 of the door 91, and in place of the door holding pad 72 of the second holding jig 23R2 holding at the point PC, the lower part of the door 91 is held by the urethane pad 42 of the door H-receiving member 24.

In this way, the dual arm robot 11 of the door removing system 1 of the present embodiment includes:

the door H-receiving member 24 (urethane pad 42) serving as a load bearing member that receives the force in the direction of gravitational force of the door (door 91, etc.); and the first holding jig 23R1 serving as a holding tool that holds the door, in which the first holding jig 23R1 can vary the relative distance between two points (points PA and PB) by way of the model-switching shift member 55 (FIG. 2), and has the two door holding pads 53 and 54 that abut the opening portion in the inner panel of the door (the opening portion 120 of the door 91, etc.). Among the two door holding pads 53 and 54, one of the pads (door holding pad 53 in the present embodiment) abuts the opening portion in a direction receiving the force in the direction of the gravitational force of the door, and the other one of the pads (door holding pad 54 in the present embodiment) abuts the opening portion in a direction receiving the moment generated by the load bearing member (door H-receiving member 24) and the one pad.

It thereby becomes possible to further exert the effects of the following (3) to (5) in addition to the effects of the aforementioned (1) and (2) in the present embodiment.

(3) Since the door can be held by the load bearing member (door H-receiving member 24) and one holding tool (first holding jig 23R1), the required arms of the robot upon removing the door from the body is simply one (only the first arm 22R1 in the present embodiment). Therefore, establishing one of the dual arm robots 11 per at least one door is sufficient in the door removing process.

(4) Since only causing the pad (door holding pad 53 and 54) to abut the opening portion of the door is sufficient, a motive force is not required for holding, and it is possible to achieve a size reduction in the holding tool (first holding jig 23R1).

(5) Due to using the opening portion of the inner panel of the door in the holding thereof, the door will not be scratched.

Furthermore, among the actions of the dual arm robot 11 in the door removing process, the details of the bolt loosening action (refer to FIG. 5) to which such a door holding technique described above while referencing FIG. 25 is applied and the door holding and transporting action (refer to FIG. 6) to which the door 3-point holding technique described above while referencing FIGS. 19 to 24 will be explained hereinafter while referencing FIGS. 26 and 27.

Figure 26:
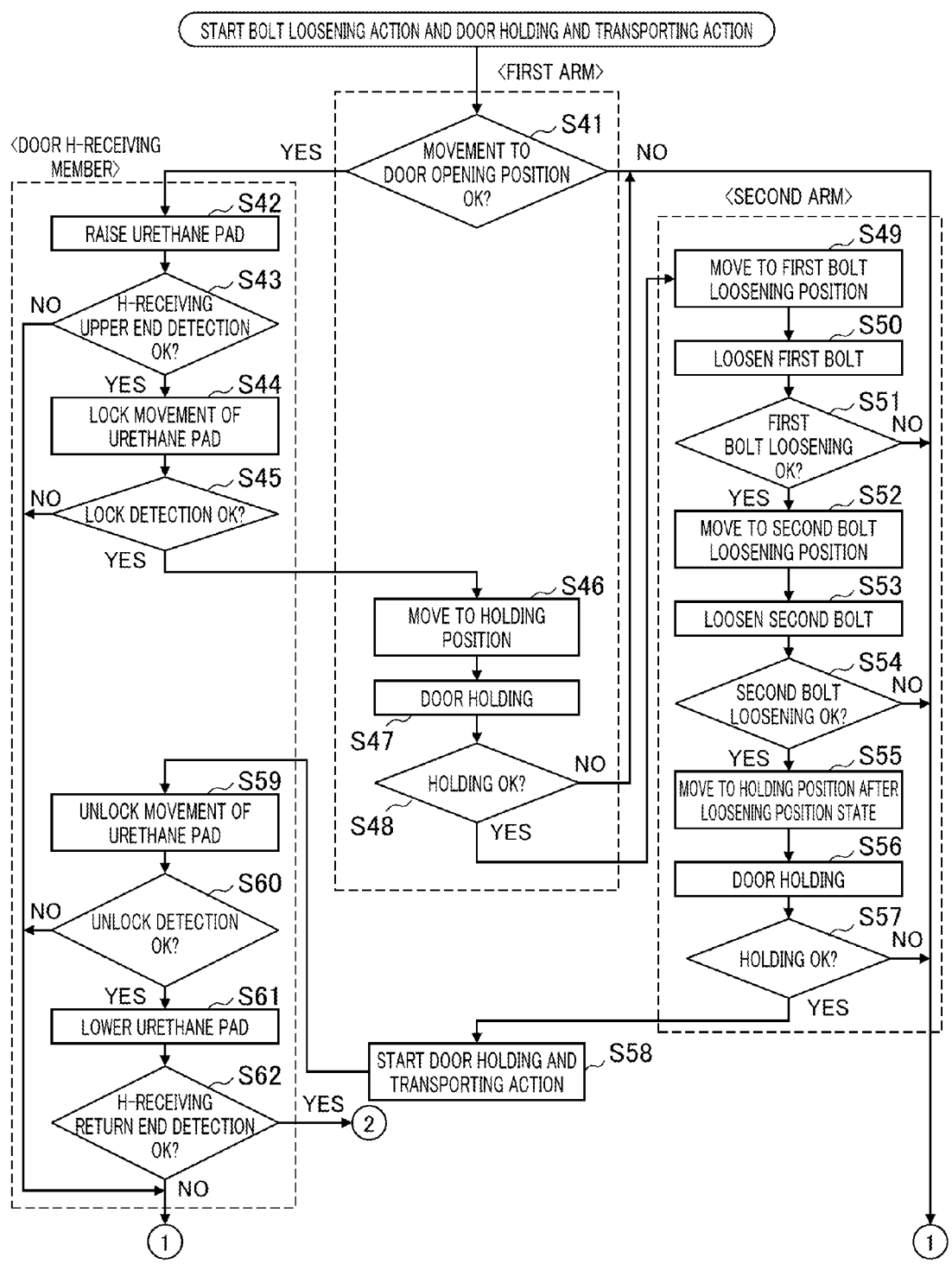
FIG. 26 is a flowchart illustrating details of the bolt loosening action and the door holding and transporting action, among the actions of the dual arm robot in the door removing process.
Figure 27:
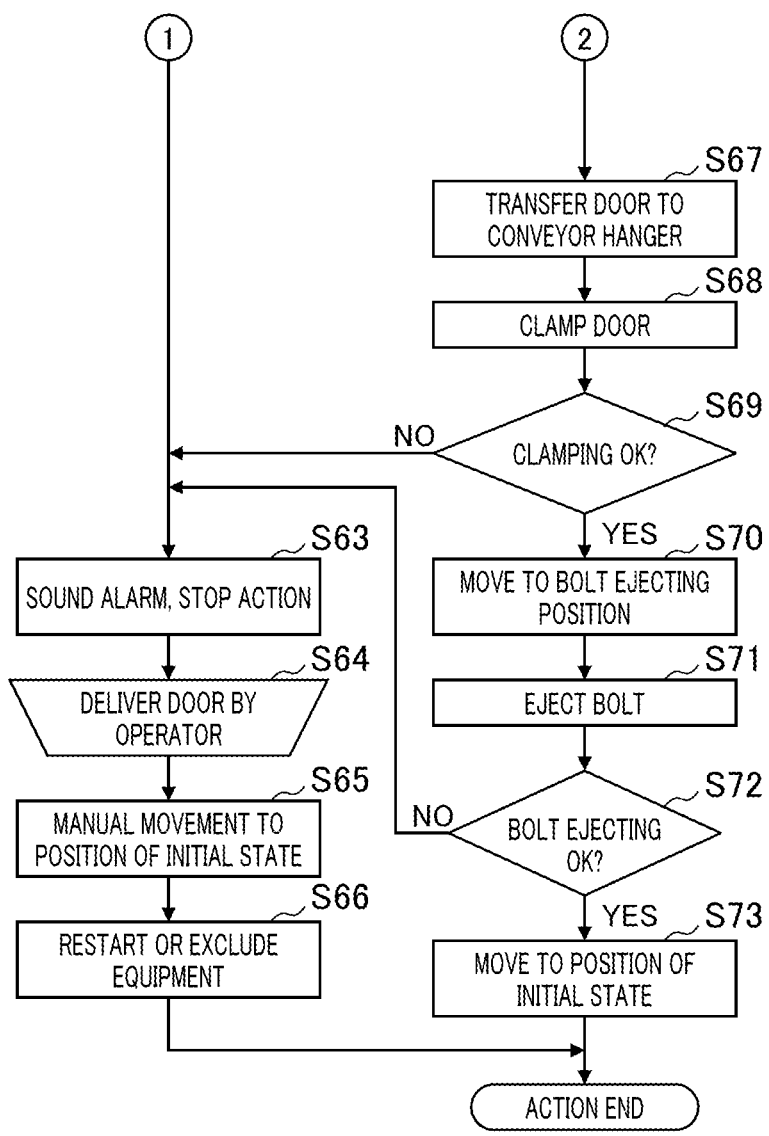
FIG. 27 is a flowchart illustrating details of the bolt loosening action and the door holding and transporting action, among the actions of the dual arm robot in the door removing process.

FIGS. 26 and 27 are flowcharts illustrating the details of the bolt loosening action and door holding and transporting action among the actions of the dual arm robot 11 in the door removing process.

As explained in the foregoing, when the door opening action shown in FIG. 4 ends, the bolt loosening action and the door holding and transporting action begin. More precisely, when the dual arm robot 11 moves to the door holding position entering the interior side of the door by way of the rotational action of the shaft S1 and the shaft S2 (refer to Steps S21 to S26 in FIG. 9), the bolt loosening action begins, and subsequently, if the bolt loosening action ended normally, the door holding and transporting action is begun.

It should be noted that each of the first arm 22R1, second arm 22R2 and door H-receiving member 24 is driven according to the control of the control unit 12 (FIG. 1); however, FIGS. 26 and 27 are illustrated with the acting agents.

In addition, although the following explanation is made with the work being the door 91 in FIG. 19, etc., in the case of a door of a different model such as the door 131 of FIG. 22, the actions explained hereinafter are executed.

In Step S41 of FIG. 26, it is determined whether the movement of the first arm 22R1 to the door holding position is appropriate (movement OK).

In a case of the dual arm robot 11 not having moved to the position decided in advance as the door holding position, it is determined as NO in Step S41, the processing advances to Step S63 in FIG. 27, and predetermined error processing is executed. It should be noted that the processing of Steps S63 and after will be described later.

In contrast, in a case of the dual arm robot 11 moving to the position decided in advance as the door holding position, it is determined as YES in Step S41, and the processing advances to Step S42.

In Step S42, the door H-receiving member 24 causes the urethane pad 42 to rise by way of the lift cylinder 41.

In Step S43, it is determined whether the measurement cylinder 43 has detected an H-receiving upper end of the door H-receiving member 24.

Herein, the H-receiving upper end is the end on which the position at which the urethane pad 42 contacts the lower part of the door 91 and load thereof is borne is established.

In a case of the rising of the urethane pad 42 stopping and the H-receiving upper end not being detected, it is determined as NO in Step S43, the processing advances to Step S63 of FIG. 27, and predetermined error processing is executed. It should be noted that the processing of Steps S63 and after will be described later.

In contrast, in a case of the H-receiving upper end having been detected, it is determined as YES in Step S43, and the processing advances to Step S44.

In Step S44, the door H-receiving member 24 locks the rising and lowering movement of the urethane pad 42.

In Step S45, it is determined whether the lock detection of the door H-receiving member 24 is appropriate (lock detection OK).

Herein, although not illustrated, the door H-receiving member 24 is established to have a mechanism detecting the locking and unlocking of the rising and lowering movement of the urethane pad 42 (hereinafter referred to as "lock detection mechanism").

In a case of the locking not being detected by the lock detection mechanism, it is determined as NO in Step S45, the processing advances to Step S63 of FIG. 27, and predetermined error processing is executed.

It should be noted that the processing of Steps S63 and after will be described later.

In contrast, in a case of locking being detected by the lock detection mechanism, it is determined as YES in Step S45, and the processing advances to Step S46.

It should be noted that, in the door opening action, the door opening pin 56 of the first holding jig 23R1 is inserted in a gap between the upper side of the outer panel 102 and the upper side of the panel main body 111 of the inner panel 101, as described in the foregoing by referencing FIG. 4. Therefore, in a case of the door opening pin 56 still being inserted in the gap at the moment when it is determined to be YES in Step S45, the door opening pin 56 is drawn out from the gap, and the processing advances to Step S46.

In Step S46, the first arm 22R1 moves to the holding position. Herein, the holding position refers to a position at which the door holding pads 53 and 54 of the first holding jig 23R1 serving as the end effector are arranged in the vicinity of the points PA and PB of the opening portion 120 of the door 91.

In Step S47, the first arm 22R1 holds the door 91 using the door holding pads 53 and 54 of the first holding jig 23R1 serving as the end effector.

In Step S48, it is determined whether holding by the first arm 22R1 is appropriate (holding OK).

Herein, "holding OK" refers to a state in which each of the door holding pads 53 and 54 of the first holding jig 23R1 are holding at the points PA and PB of the opening portion 120 of the door 91, respectively.

In other words, the state shown in the aforementioned FIG. 25, i.e. state in which the door 91 is being held by the first holding jib 23R1 serving as the end effector of the first arm 22R1 (more precisely, the door holding pads 53 and 54) and the urethane pad 42 of the door H-receiving member 24, is holding OK.

In the case of being holding OK, the door 91 is firmly fixed; therefore, the second arm 22R2 becomes able to appropriately perform the bolt loosening action.

In other words, in the case of not being holding OK, the second arm 22R2 will not be able to appropriately perform the bolt loosening action; therefore, it is determined as NO in Step S48, the processing advances to Step S63 in FIG. 27, and predetermined error processing is executed. It should be noted that the processing of Steps S63 and after will be described later.

In contrast, in the case of being holding OK, it is determined as YES in Step S48, and the processing advances to Step S49.

Herein, in the present example, there are two bolts temporarily fixing the door 91 to the body 92, and the loosening sequence is decided in advance. Therefore, in order to clearly distinguish these two bolts, the bolt loosened firstly is called the "first bolt" and the bolt loosened secondly is called the "second bolt".

In Step S49, the second arm 22R2 move to a first bolt loosening position.

Herein, the first loosening position refers to a position at which the bolt loosening tool 74 of the second holding jig 23R2 serving as the end effector is arranged in the vicinity of the first bolt temporarily fixed to the door 91.

In Step S50, the second arm 22R2 loosens the first bolt using the bolt loosening tool 74 of the second holding jig 23R2 serving as the end effector.

It should be noted that the details of the bolt loosening action by the bolt loosening tool 74 will be described later while referencing FIGS. 28 to 32.

In Step S51, it is determined whether the loosening of the first bolt by the second arm 22R2 is appropriate (loosening OK).

Herein, in a case of the first bolt having been loosened and removed, the loosening of the first bolt is determined as OK, and in other cases, it determined as NO.

More specifically, in a case of the first bolt not having been removed for some reason, it is determined as NO in Step S51, the processing advances to Step S63 of FIG. 27, and predetermined error processing is executed. It should be noted that the processing of Steps S63 and after will be described later.

In contrast, in a case of the loosening of the first bolt being OK, it is determined as YES in Step S51, and the processing advances to Step S52.

In Step S52, the second arm 22R2 moves to a second bolt loosening position.

Herein, the second loosening position refers to a position at which the bolt loosening tool 74 of the second holding jig 23R2 serving as the end effector is arranged in the vicinity of the second bolt temporarily fixed to the door 91.

In Step S53, the second arm 22R2 loosens the second bolt using the bolt loosening tool 74 of the second holding jig 23R2 serving as the end effector.

It should be noted that the details of the bolt loosening action by the bolt loosening tool 74 will be described later while referencing FIGS. 28 to 32.

In Step S54, it is determined whether the loosening of the second bolt by the second arm 22R2 is appropriate (loosening OK).

Herein, in a case of the second bolt having been loosened and removed, the loosening of the second bolt is determined as OK, and in other cases, it determined as NO.

More specifically, in a case of the second bolt not having been removed for some reason, it is determined as NO in Step S54, the processing advances to Step S63 of FIG. 27, and predetermined error processing is executed. It should be noted that the processing of Steps S63 and after will be described later.

In contrast, in a case of the loosening of the second bolt being OK, it is determined as YES in Step S54, and the processing advances to Step S55.

In Step S55, the second arm 22R2 moves to the holding position after having transitioned from the holding position state shown in FIG. 3B to the loosening position state shown in FIG. 3A. Herein, the holding position refers to a position at which the door holding pad 72 of the second holding jig 23R2 serving as the end effector is arranged in the vicinity of the point PC on the opening portion 120 of the door 91.

In Step S56, the second arm 22R2 holds at the point PC of the opening portion 120 of the door 91 using the door holding pad 72 of the second holding jig 23R2 serving as the end effector.

In Step S57, it is determined whether holding by the second arm 22R2 is appropriate (holding OK).

Herein, "holding OK" in regards to the second arm 22R2 refers to a state in which the door holding pad 72 of the second holding jig 23R2 is holding at the point PC of the opening portion 120 of the door 91, as shown in FIG. 19.

More specifically, at this stage, "holding OK" in regards to the first arm 22R1, i.e. a state in which each of the door holding pads 53 and 54 of the first holding jig 23R1 are holding at the points PA and PB of the opening portion 120 of the door 91, respectively, is established. Therefore, if "holding OK" in regards to the second arm 22R2 is established, the 3-point holding such as that shown in FIG. 19 comes to be established, and it is possible to begin the door holding and transporting action in this state.

In other words, in a case of "holding OK" in regards to the second arm 22R2 not being established, it is not possible to begin the door holding and transporting action; therefore, it is determined as NO in Step S57, the processing advances to Step S63 of FIG. 27, and predetermined error processing is executed. It should be noted that the processing of Steps S63 and after will be described later.

In contrast, in a case of "holding OK" in regards to the second arm 22R2 being established, it is determined as YES in Step S57, and the processing advances to Step S58.

In Step S58, the dual arm robot 11 causes the door holding and transporting action to begin.

In Step S59, the door H-receiving member 24 unlocks the rising and lowering movement of the urethane pad 42.

In Step S60, it is determined whether the unlock detection of the door H-receiving member 24 is appropriate (unlock detection OK).

In a case of unlocking not having been detected by the aforementioned lock detection mechanism, which is not illustrated, it is determined as NO in Step S60, the processing advances to Step S63 of FIG. 27, and predetermined error processing is executed. It should be noted that the processing of Steps S63 and after will be described later.

In contrast, in a case of unlocking being detected by the lock detection mechanism, it is determined as YES in Step S60, and the processing advances to Step S61.

In Step S61, the door H-receiving member 24 causes the urethane pad 42 to lower by way of the lift cylinder 41.

In Step S62, it is determined whether the measurement cylinder 43 has detected an H-receiving return end of the door H-receiving member 24.

Herein, the H-receiving return end is the end on which a position separated by a predetermined distance below the H-receiving upper end is established. In a case of the lowering of the urethane pad 42 stopping and the H-receiving return end not having been detected, it is determined as NO in Step S62, the processing advances to Step S63 of FIG. 27, and predetermined error processing is executed. It should be noted that the processing of Steps S63 and after will be described later.

In contrast, in a case of the H-receiving return end having been detected, it is determined as YES in Step S62, and the processing advances to Step S67 of FIG. 27.

In Step S67, the dual arm robot 11 moves to a conveyor hanger while holding the door 91, and transfers the door 91 to the conveyor hanger.

In Step S68, the dual arm robot 11 clamps the door 91.

In Step S69, it is determined whether the clamping of the door by the dual arm robot 11 is appropriate (clamping OK).

In a case of the clamping of the door 91 being flawed, it is determined as NO in Step S69, the processing advances to Step S63, and predetermined error processing is executed. It should be noted that the processing of Steps S63 and after will be described later.

In contrast, in a case of the clamping of the door 91 being successful, it is determined as YES in Step S69, and the processing advances to Step S70.

In Step S70, the dual arm robot 11 moves to a bolt ejecting position. Herein, bolt ejecting position refers to a position at which ejecting of the first bolt and second bolt becomes possible by the bolt ejecting mechanism 76 of the second holding jig 23R2 serving as the end effector of the second arm 22R2.

In Step S71, the dual arm robot 11 ejects the first bolt and the second bolt using the bolt ejecting mechanism 76.

In Step S72, it is determined whether the bolt ejecting by the dual arm robot is appropriate (bolt ejecting OK).

In a case of the ejecting of the bolts being flawed, it is determined as NO in Step S72, the processing advances to Step S63, and predetermined error processing is executed. It should be noted that the processing of Steps S63 and after will be described later.

In contrast, in a case of the ejecting of the bolts being successful, it is determined as YES in Step S72, and the processing advances to Step S73.

In Step S73, the dual arm robot 11 moves to the position of the initial state (refer to FIG. 4).

The bolt loosening action and the door holding and transporting action are thereby finished.

It should be noted that, if a principal action of the dual arm robot is flawed as described in the foregoing, the processing advances to Step S63, and the following such processing is executed as predetermined error processing.

In Step S63, the dual arm robot 11 sounds an alarm and causes its action to stop.

Therefore, it should be noted that the following Steps S64 to S66 are operations by the operator or actions of the dual arm robot 11 by way of manual operation of the operator.

In Step S64, the operator conveys the door.

In Step S65, the operator causes the dual arm robot 11 to manually move to the position of the initial state (refer to FIG. 4).

In Step S66, the operator causes the dual arm robot 11 to restart, or excludes (repairs, etc.) the dual arm robot 11 from the door removing process in a case of not being able to restart or the like.

The bolt loosening action and the door holding and transporting action are thereby completed.

Herein, the differences between the technique of the present embodiment and the conventional technique will be explained for the implementation technique of the bolt loosening action and the door holding and transporting action in the door removing process.

According to the conventional technique, a door removing system established in a door removing process is provided with a single arm robot in addition to a dual arm robot. As a result, in the case of the conventional door removing system removing a door, the pair of arms (manipulators) of the dual arm robot has held the door from above and below, and the single arm robot has loosened the bolts temporarily fixing the door to the body.

With such a conventional technique, the following first and second problems have arisen.

The first problem is the problem of it being necessary to separately arrange the robot holding the door and the robot loosening the bolts.

The second problem is the problem of it being necessary to use a heavy robot of excessive weight in order to hold the door from above and below, a result of which the door removing system expands size overall.

In contrast, by applying the technique of the present embodiment described above using FIGS. 25 to 27, these first and second problems of the prior art can be eliminated.

More specifically, in order to realize the bolt loosening action and the door holding and transporting action in the door removing process, load bearing of the door 91, locking of the door 91 in the back lateral direction, loosening of the bolts, and holding the door after the loosening become necessary.

Therefore, in the dual arm robot 11 of the present embodiment, the first arm 22R1 and second arm 22R2 as a pair of manipulators, and the door H-receiving member 24 functioning as a device for load bearing of the door (door 91, etc.) are provided.

The door is supported by the first arm 22R1 as one arm and the door H-receiving member 24, while the second arm 22R2 that is the other arm loosens and removes the bolts, after which the second arm 22R2 having removed the bolts holds and transports the door in cooperation with the first arm 22R1 supporting the door 91 in advance.

Although two robots are necessary in the conventional technique, by adopting the technique of the present embodiment in this way, one dual arm robot 11 is sufficient, whereby the first problem is solved, and further, the layout properties of the facility improve.

In addition, in the conventional technique, the door has been held from above and below; whereas, in the technique of the present embodiment, the door is held by holding tools (door holding pads 53, 54 and 72) installed to the first arm 22R1 or second arm 22R2 inserted into an opening portion of the door. It is thereby possible to disperse the weight of the door. Since it is thereby possible to employ a dual arm robot that is small in layout with the technique of the present embodiment, the second problem can be solved.

Furthermore, since the outer panel surface of the door is not held with the technique of the present embodiment, external damage to the door can be mitigated.

As explained in the foregoing, the dual arm robot 11 of the present embodiment functions as a door removing device that removes a door (door 91, etc.) fixed with bolts to the body of a vehicle from the body.

The dual arm robot 11 having such a function includes:
the first arm 22R1 having a holding jig that holds the door (first holding jig 23R1 in the present embodiment);
the second arm 22R2 having a bolt removing mechanism to remove a bolt fixing the door and a holding jig that holds the door (has the second holding jig 23R2 including both the door holding pad 72 and the bolt loosening tool 74 in the present embodiment); and
a door H-receiving member 24 as a load bearing member that receives the load in the direction of the gravitational force of the door.

More specifically, the dual arm robot 11 includes:
the first arm 22R1 having a holding jig that inserts into an opening portion of the inner panel of a door and holds the door (first holding jig 23R1 in the present embodiment);
the second arm 22R2 having a bolt removing mechanism that removes bolts fixing the door and a holding jig that inserts into an opening portion of the inner panel of a door and holds the door (has the second holding jig 23R2 including both the door holding pad 72 and the bolt loosening tool 74 in the present embodiment); and
the door H-receiving member 24 as a load bearing member that is provided to the robot main body 21 as a stand of the first arm 22R1 and the second arm 22R2, and receives the load in the direction of the gravitational force of the door.

The dual arm robot 11 of such a configuration,
in the bolt loosening action,
sets the load bearing member (door H-receiving member 24) receiving the load of the door at the lower part of the door,
receives the moments in the direction of gravitational force of the door and the lateral direction of the door with one arm of the dual arm robot 11 (first arm 22R1 in the present embodiment), and removes the bolts fixing the door with the other arm (second arm 22R2 in the present embodiment), and in the door holding and transporting action, receives the moments in the direction of the gravitational force of the door and the lateral direction of the door with one arm of the dual arm robot 11 (first arm 22R1 in the present embodiment), as well as holding the door with the other arm (second arm 22R2 in the present embodiment).

It thereby becomes possible to further exert the effects of the following (6) to (8) in addition to the effects of the aforementioned (1) to (5) in the present embodiment.

(6) In the door removing process, it is sufficient to establish only one of the dual arm robots 11 per at least one door. The number of robots established in the door removing process can thereby be reduced, whereby the layout properties of the facility improve.

(7) By inserting the holding tool in an opening portion, it is possible to disperse the weight of the door acting on the robot; therefore, it is possible to implement the dual arm robot 11 with a smaller configuration.

(8) Since an outer panel surface of the door is not held, external damage to the door can be mitigated.

Among the actions of the dual arm robot 11 in the door removing process, the details of the bolt loosening action (refer to FIG. 5) and the door holding and transporting action (refer to FIG. 6) have been explained in the foregoing while referencing FIGS. 25 to 27.

Next, the details of the bolt loosening tool 74 used in the bolt loosening action will be explained while referencing FIGS. 28 to 32.

Figure 28:
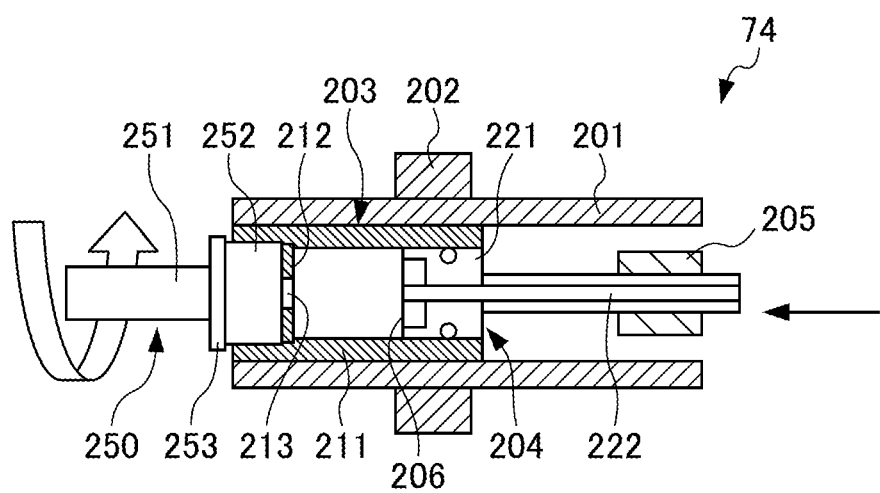
FIG. 28 is a longitudinal section view of a bolt loosening tool prior to loosening a bolt.

FIG. 28 is a longitudinal sectional view of the bolt loosening tool 74 prior to loosening a bolt.

The bolt loosening tool 74 is installed to the other end in the longitudinal direction of the frame 73 of the second holding jig 23R2 of the dual arm robot 11 (refer to FIGS. 3A and 3B, and can loosen and remove a bolt 250 temporarily fixing the door to the body of a vehicle that is not illustrated in FIG. 28.

The bolt loosening tool 74 includes a cylinder 201, a gear 202, a sliding socket 203, a fluid mechanism 204, a bearing 205, and a magnet 206.

It should be noted that the bolt 250 includes a threaded trunk part 251, a bolt head 252 provided at the leading end of the threaded trunk part 251, and a flange 253 provided between the bolt head 252 and the threaded trunk part 251.

Figure 29:
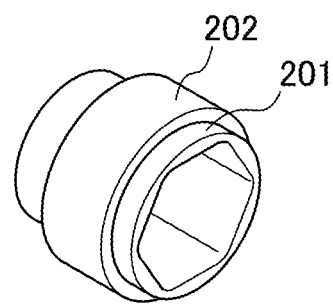
FIG. 29 is a perspective view showing an exterior configuration of a cylinder and a gear.

FIG. 29 is a perspective view showing an exterior configuration of the cylinder 201 and the gear 202.

The cylinder 201 is formed in a short cylindrical shape having a sliding bore with the cross-sectional shape of a hexagon. The cylinder 201 guides the sliding socket 203 along the axial direction by arranging the sliding socket 203 (FIG. 28) to be slidable in the axial direction along a sliding hole.

The gear 202 engages with the outer surface of the cylinder 201 in the vicinity of substantially the center in the axial direction of the cylinder 201, and causes the cylinder 201 to rotate in a circumferential direction by way of the driving power supplied from a drive source that is not illustrated, in accordance with the control of the control unit 12 shown in FIG. 1.

Referring back to FIG. 28, the sliding socket 203 includes a side edge 211, an engaging part 212, and a hole 213.

The side edge 211 is formed in a substantially cylindrical shape.

The inside of the advancing end side of the side edge 211 (left side in FIGS. 28, 31 and 32) is formed in a dimension that can fit the bolt head 252 of the bolt 250, and the side edge 211 and the bolt 250 are engaged to be slidable in the axial direction and rotatable synchronously with each other in the circumferential direction. The inside of the retracting end side of the side edge 211 (right side in FIGS. 28, 31 and 32) is formed in a dimension that allows sliding of a base 221 of the fluid mechanism 204 described later.

In addition, the inside diameter dimension of the advancing end side of the side edge 211 is formed to be smaller than the diameter dimension of the flange 253 of the bolt 250, and the outside diameter dimension of the advancing end side of the side edge 211 is formed to be larger than the diameter dimension of the flange 253 of the bolt 250. Only the bolt head 252 of the bolt 250 is thereby accommodated in the sliding socket 203, and the bolt 250 is able to slide freely in the axial direction inside of the cylinder 201 along with the sliding socket 203, without catching even if the flange 253 being provided thereto.

The engaging part 212 is formed in a plate shape in which the hole 213 is formed in the center thereof, and is arranged in the middle in the axial direction of the side edge 211 inside of the side edge 211.

Figure 30:
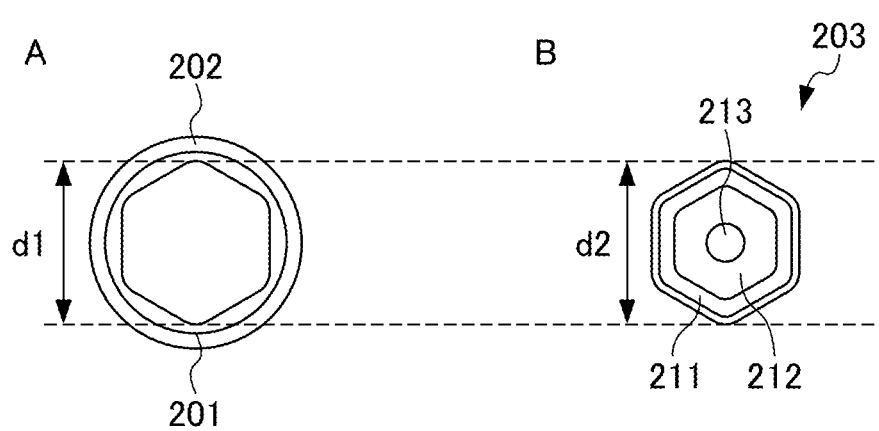
FIG. 30 is a lateral sectional view showing a configuration of the cylinder and a sliding socket.

FIG. 30 is a lateral sectional view showing the configurations of the cylinder 201 and the sliding socket 203.

As shown in FIG. 30, the inside diameter dimension d1 of the cylinder 201 is formed in a dimension that is substantially the same as the external dimension of the side edge 211 of the sliding socket 203, and the sliding socket 203 is arranged inside of the cylinder 201 so as to be able to slide along the axial direction thereof.

Referring back to FIG. 28, the fluid mechanism 204 includes the base 221 and a fluid channel 222.

The base 221 is formed in a short rod shape, and is arranged at the rear end of the interior of the side edge 211 to be slidable along the axial direction of the side edge 211.

The fluid channel 222 is formed in a long cylindrical shape, and includes a flow path through which air can penetrate at the interior thereof. In other words, the fluid channel 222 discharges air to the advancing end side through the interior flow path, in accordance with the control of the control unit 12 shown in FIG. 1.

The flow path of the fluid channel 222 penetrates the base 221 at one end in the longitudinal direction, and is connected to a fluid reservoir that is not illustrated in which air is stored at the other end in the longitudinal direction. The fluid channel 222 having such a flow path is fixed by the bearing 205 arranged at a predetermined position in the longitudinal direction.

In other words, the flow path of the fluid mechanism 204 discharges air stored in the fluid reservoir that is not illustrated, through the fluid channel 222, from the base 221 arranged at one end in the length direction. When this is done, the discharged air presses the sliding socket 203 to push the bolt 250 out to the forward end side by the energy thereof.

In addition, the sliding socket 203 stops discharging air from the fluid channel 222 according to the control of the control unit 12 shown in FIG. 1, and causes the air to flow back from the one end to the other end. The pressing by the air from the retracting end side to the advancing end side is thereby ceased. In this state, the bolt loosening tool 74 turns to loosen the bolt 250, in accordance with the control of the control unit 12 shown in FIG. 1. When this is done, the bolt 250 rises up from the axial force, and moves to the retracting end side, and the sliding socket 203 moves by sliding inside of the cylinder 201 to the retracting end side from the advancing end side with the bolt 250 having thereby moved.

It should be note that, although air is discharged from the flow path of the fluid channel 222, the fluid discharged from the flow path is not limited thereto, and just needs to be a fluid having characteristics allowing to be discharged from the flow path, as a gas or liquid and the like.

The details of the actions of the sliding socket 203 and bolt 250 due to the fluid mechanism 204 will be described later while referencing FIGS. 31 and 32.

The magnet 206 is provided to an end at the advancing end side of the base 221. In a case of the sliding socket 203 sliding to the retracting end side and the engaging part 212 abutting, the magnet 206 retains the bolt 250 having the bolt head 252 abutting an opposite side of the engaging part 212 by way of the magnetic force thereof, as described later while referencing FIG. 31.

The configuration of the bolt loosening tool 74 in the second holding jig 23R2 in FIGS. 3A and 3B has been explained above while referencing FIGS. 28 to 30.

Next, the action of loosening the bolt 250 by way of the bolt loosening tool 74 will be explained while referencing FIGS. 31 and 32 in addition to the aforementioned FIG. 28.

The state of the bolt loosening tool 74 prior to loosening the bolt 250 is as shown in FIG. 28.

In other words, the bolt loosening tool 74 performs alignment of the sliding socket 203 so as to enter the state shown in FIG. 28, in accordance with the control of the control unit 12 shown in FIG. 1.

More specifically, the fluid channel 222 of the fluid mechanism 204 discharges air supplied from a fluid reservoir that is not illustrated, to the advancing end side through the flow path, in accordance with the control of the control unit 12. The pressure of the air discharged at this time is set to 1 (kgf/cm$^2$) in the present embodiment.

In this case, the air discharged from the fluid channel 222 impinges on the engaging part 212 of the sliding socket 203, and causes the sliding socket 203 to move to the advancing end side by way of the pressing force thereof.

Therefore, prior to loosening the bolt 250, it is possible to align at a position to make the sliding socket 203 engage with the bolt 350, by causing the sliding socket 203 to move to the advancing end side, in accordance with the control of the control unit 12 shown in FIG. 1.

In this state, it is possible to set the sliding socket 203 at a thread unfastening position of the bolt 250 by causing the second holding jig 23R2 (FIGS. 1 and 3) to move until a position at which the bolt head 252 of the bolt 250 is engaged with the engaging part 212 on the inner side on the advancing end of the sliding socket 203.

Figure 31:
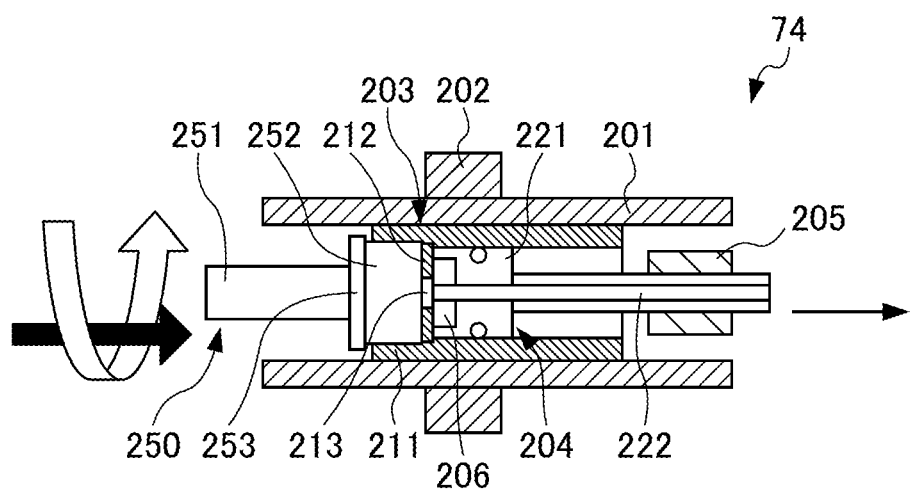
FIG. 31 is a longitudinal sectional view of a bolt loosening tool in the middle of loosening a bolt.

FIG. 31 is a longitudinal sectional view of the bolt loosening tool 74 in the middle of loosening the bolt 250.

The bolt loosening tool 74 loosens the bolt 250 and removes it from the body of a vehicle that is not illustrated, in accordance with the control of the control unit 12 shown in FIG. 1.

More specifically, the gear 202 transmits the torque from the driving force supplied from the driving power supplied from a drive source that is not illustrated, and causes the cylinder 201 to rotate in the circumferential direction, in accordance with the control of the control unit 12.

In this case, the cylinder 201 driven in the circumferential direction and the sliding socket 203 are engaged so as to rotate synchronously with each other in the circumferential direction; therefore, the torque is transmitted together with the rotation of the cylinder 201, and the sliding socket 203 similarly rotates in the circumferential direction as well.

In addition, in this case, the sliding socket 203 and the bolt head 252 of the bolt 250 are connected so as to synchronously rotate with each other in the circumferential direction, and thus torque is transmitted together with the rotation of the sliding socket 203, and the bolt 250 similarly rotates in the circumferential direction as well.

In this case, the sliding socket 203 stops discharging air from the fluid channel 222, and causes the air to flow back from the one end to the other end, in accordance with the control of the control unit 12 shown in FIG. 1. Therefore, the pressing on the sliding socket 203 from the air from the retracting end side to the advancing end side is ceased.

Consequently, by way of the bolt loosening tool 74 turning and loosening the bolt 250 in accordance with the control of the control unit 12 shown in FIG. 1, in this state, the bolt 250 rises up from the axial force, and moves to the retracting end side, and the sliding socket 203 slides inside of the cylinder 201 from the advancing end side to the retracting end side with the bolt 250 thereby having moved.

Then, the bolt 250 having moved to the retracting end side is attracted by abutting the magnet 206 provided to the end on the advancing end side of the base 221 of the fluid mechanism 204 of the sliding socket 203, and is locked thereto. More precisely, by the engaging part 212 of the sliding socket 203 abutted by the bolt head 252 of the bolt 250 abutting the magnet 206, the bolt 250 is attracted and fixed to the magnet 206 across the engaging part 212.

Therefore, in the case of loosening the bolt 250, the bolt loosening tool 74 can turn and loosen the bolt 250 by driving the gear 202 to rotate the cylinder 201 and the sliding socket 203, in accordance with the control of the control unit 12 shown in FIG. 1. Then, the bolt loosening tool 74 can cause the bolt head 252 of the bolt 250 (more precisely, the engaging part 212 of the sliding socket 203) to abut the magnet 206 provided to the fluid mechanism 204. The bolt 250 is attracted to the magnet 206, and is thereby retained inside of the bolt loosening tool 74.

Figure 32:
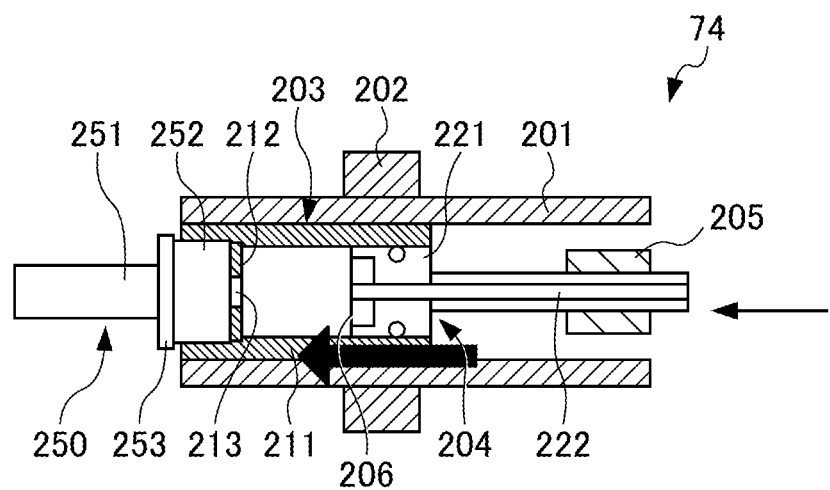
FIG. 32 is a longitudinal sectional view of a bolt loosening tool in a state ejecting a bolt.

FIG. 32 is a longitudinal sectional view of the bolt loosening tool 74 in a state ejecting the bolt 250.

The state of the second holding jib 23R2 transitions from the loosening position state shown in FIG. 3A to the holding position state shown in FIG. 3B, in accordance with the control of the control unit 12 shown in FIG. 1.

In this holding state shown in FIG. 3B, the bolt loosening tool 74 ejects the bolt 250 being retained to the bolt ejecting mechanism 76 (FIGS. 3A and 3B), in accordance with the control of the control unit 12.

More specifically, the fluid channel 222 of the fluid mechanism 204 discharges air supplied from a fluid reservoir that is not illustrated through the flow path to the bolt 250 side. The pressure of the air discharged at this time is set to 1 (kgf/cm$^2$) in the present embodiment.

In this case, the air discharged from the fluid channel 222 impinges on the engaging part 212 of the sliding socket 203, and causes the sliding socket 203 to move to the advancing end side by way of the pressing force thereof.

At this time, the bolt 250 and the magnet 206 are separated by the bolt 250 being moved to the advancing end side, and the magnetic force between the bolt 250 and the magnet 206 weakens, a result of the attraction of the bolt 250 by the magnet 206 is lost and the locking is released.

In this way, it is possible to release the retaining of the bolt 250 inside of the sliding socket 203 and to eject the bolt 250 to the external bolt ejecting mechanism 76 (FIGS. 3A and 3B), by causing the sliding socket 203 to move to the advancing end side by way of the discharging of air in accordance with the control of the control unit 12 shown in FIG. 1.

Herein, the differences between the technique of the present embodiment and the conventional technique will be explained for the technique applied to the bolt loosening action in the door removing process.

In the prior art, the technique of loosening bolts has been adopted in a robot equipped with a drive source such as an electric nut runner.

In other words, in the prior art, a technique has been used in which the robot is made to float to match the bolt being unfastened, or in which the tool has a floating mechanism and the tool floats from the axial force of the bolt.

In such a conventional technique, the following such first to fourth problems have arisen.

The first problem is the problem of, due to being a large device, it is not easy to use in a narrow part of in a facility with a lot of interference.

The second problem is the problem of not being able to be used on a long bolt or flanged bolt, despite being able to be used on a hexagonal nut.

The third problem is that, in the case of allowing floating with the robot, it is necessary to match the movement of the robot with the movement of the bolt, and thus teaching of the movement action of the robot is complicated.

The fourth problem is the problem of the size of the tool must be decreased in proportion to the amount of floating, since the tool is floating in a narrow part with little clearance.

In contrast, these first to fourth problems of the prior art can be overcome by applying the technique of the present embodiment described above using FIGS. 28 to 32.

In other words, with the technique of the present embodiment, the bolt 250 can be stored inside of the sliding socket 203 without displacing the bolt loosening tool 74 when removing the bolt 250.

In addition, the bolt loosening tool 74 of the present embodiment can slide the bolt 250 in the axial direction to store the bolt 250 inside of the bolt loosening tool 74, by transmitting the torque for loosening the bolt 250 through the sliding socket 203. It is no longer necessary to displace the bolt loosening tool that had conventionally needed to be displaced, whereby the first problem, third problem and fourth problem are overcome.

In addition, the bolt loosening tool 74 of the present embodiment can attract the bolt 250 by way of the magnet 206 to lock it, after having stored the bolt 250 inside of the sliding socket 203.

Furthermore, in the bolt loosening tool 74 of the present embodiment, the nut and bolt do not each slide inside of the socket as an individual body as in the prior technology, but rather are stored inside of the sliding socket 203 in a state in which the nut and bolt fit together as in a flanged bolt Then, the sliding socket 203 can slide along the axial direction inside of the cylinder 201, which is cut to the outside diameter shape of the sliding socket 203. In other words, even if a bolt projecting radially as in a flanged bolt, it is possible to loosen, remove and store the bolt. It thereby becomes possible to slide and eject the bolt even if a flanged bolt or the like projecting radially that has not been able to make slide conventionally, whereby the second problem is overcome.

In addition, with the bolt loosening tool 74 of the present embodiment, sliding in the axial direction to loosen the bolt 250 and ejecting of the bolt are performed by way of air. It is thereby no longer necessary to displace the robot to match the movement of the bolt, whereby the third problem is overcome.

In this way, the bolt loosening tool 74 applied as a socket in the door removing system 1 of the present invention is a socket for use in the removal of bolts serving as fasteners (the bolt 250 in the aforementioned example), and includes:

the engaging part 212 that engages with the fastener;

the sliding socket 203 having the engaging part 212 on an inner side thereof;

the rotatable cylinder 201 in which the sliding socket 203 slides and rotates therewith;

the magnet 206 that is provided at the retracting end side of the sliding socket 203 and contacts with the outer side of the engaging part 212; and the fluid mechanism 204 that discharges a fluid (air in the present embodiment) to push the sliding socket 203 out to the advancing end side toward the outer side of the engaging part 212.

It thereby becomes possible to further exert the effect of the following (9) in addition to the effects of the aforementioned (1) to (8).

(9) When removing the bolt 250, not only can the bolt 250 engaged with the engaging part 212 be removed by rotating and loosening by way of rotating the cylinder 201, but the bolt 250 loosened and unfastened can be attracted by the magnet 206 and retained inside of the sliding socket 203.

In addition, upon ejecting the bolt 250, by causing the cylinder 201 to rotate in the reverse direction, the magnetic force between the bolt 250 and the magnet 206 weakens and the retaining by the magnet 206 is released, and by the energy of air discharged from the fluid mechanism 204, it is possible to eject the bolt 250 to outside of the sliding socket 203.

Since it is thereby possible to perform loosening and ejecting of the bolt 250 based on the magnet 206 and the fluid mechanism 204, the removal of a door can be performed in a compact space.

It should be noted that the present invention is not to be limited to the present embodiment, and that modification, improvements and the like within the scope that can achieve the object of the present invention are to be included in the present invention.

For example, the end effectors installed to the first arm 22R1 and the second arm 22R2 of the dual arm robot 11 are not particularly limited to the aforementioned example, and any tool that enables the aforementioned various actions to be realized is sufficient.

It should be noted that, in the present disclosure, among the steps describing the actions of the door removing system, the processes performed in chronological order following the sequence thereof are naturally not necessary processed in chronological order, and also includes processes executed in parallel or individually.

In addition, in the present disclosure, the system represents the overall apparatus configured by a plurality of devices and processing units.

What is claimed is:

1. A work method of opening a door of a vehicle body executed by a door opening device, the door opening device comprising:

a base portion;

a first swivel portion that is installed to an upper part of the base portion to be swivelable about a first rotational shaft in a substantially vertical direction;

a second swivel portion that is disposed at the first swivel portion to be offset horizontally relative to the first rotational shaft; and a first arm having a first tool for opening a door from the vehicle body and a second arm having a second tool for performing work on a work location of the door, the first tool and the second tool being disposed at the second swivel portion to be aligned in a parallel direction to ground, the method comprising:

holding the door from outside using the first tool in a state in which the first arm is directed towards the door, opening the door by causing the first swivel portion to rotate in an opposite direction to a direction of the door opening in an arc shape, further rotating the first swivel portion along with releasing holding of the door by way of the first tool in a predetermined state of the door being open, thereby moving the second swivel portion and the second arm to an interior side of the door thus opened, and working at the work location on an interior side of the door using the second tool.

2. A door opening device comprising:

a base portion;

a first swivel portion that is installed to an upper part of the base portion to be swivelable about a first rotational shaft in a substantially vertical direction;

a second swivel portion that is disposed at the first swivel portion to be offset horizontally relative to the first rotational shaft;

a first arm having a first tool for opening a door from the vehicle body and a second arm having a second tool for performing work on a work location of the door, the first tool and the second tool being disposed at the second swivel portion to be aligned in a parallel direction to ground; and a control device that controls rotation of the first swivel portion and the first arm and the second arm, wherein the control device controls so as to:

hold the door from an exterior side thereof using the first tool in a state in which the first arm is directed towards the door, open the door by causing the first swivel portion to rotate in a reverse direction to a direction of the door opening in an arc shape, further rotate the first swivel portion along with releasing holding of the door by way of the first tool in a predetermined state of the door being open, thereby moving the second swivel portion and the second arm to an interior side of the door thus opened, and work at the work location on an interior side of the door using the second tool.

3. The work method of opening a door of a vehicle body according to claim 1, wherein a second rotational shaft in a substantially vertical direction disposed to be offset in a horizontal direction relative to the first rotational shaft is disposed at the first swivel portion, and wherein the second swivel portion is swivelable about the second rotational shaft.

4. The door opening device according to claim 2, wherein a second rotational shaft in a substantially vertical direction disposed to be offset in a horizontal direction relative to the first rotational shaft is disposed at the first swivel portion, wherein the second swivel portion is swivelable about the second rotational shaft, and wherein the control device performs control of rotation of the second swivel portion.

\* \* \* \* \*